US011497001B2

(12) United States Patent
Jiang et al.

(10) Patent No.: US 11,497,001 B2
(45) Date of Patent: Nov. 8, 2022

(54) EDGE-INTELLIGENCE FOR STABILITY GUARANTEED REAL-TIME CONTROL SYSTEMS

(71) Applicant: Kabushiki Kaisha Toshiba, Tokyo (JP)

(72) Inventors: Nan Jiang, Bristol (GB); Adnan Aijaz, Bristol (GB); Aftab Khan, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 161 days.

(21) Appl. No.: 16/952,747

(22) Filed: Nov. 19, 2020

(65) Prior Publication Data
US 2022/0159639 A1 May 19, 2022

(51) Int. Cl.
*H04W 72/04* (2009.01)
*H04W 74/00* (2009.01)
*H04W 74/08* (2009.01)

(52) U.S. Cl.
CPC ..... *H04W 72/0406* (2013.01); *H04W 74/002* (2013.01); *H04W 74/0866* (2013.01)

(58) Field of Classification Search
CPC ........... H04W 72/0406; H04W 74/002; H04W 74/0866
See application file for complete search history.

(56) References Cited

U.S. PATENT DOCUMENTS 11,159,408 B2 * 10/2021 Svennebring ......... H04L 41/147
11,290,396 B1 * 3/2022 Leung ................... H04L 41/149

(Continued)

FOREIGN PATENT DOCUMENTS

CN 108803344 A 11/2018

OTHER PUBLICATIONS

Alba Roda-Sales, et al., "Human hand kinematic data during feeding and cooking tasks", Scientific Data, 6(1) 167, Sep. 2019, doi:10.1038/s41597-019-0175-6. PMID: 31488844; PMCID: PMC6754415, 10 pages.

(Continued)

*Primary Examiner* — Liton Miah
(74) *Attorney, Agent, or Firm* — Oblon, McClelland, Maier & Neustadt, LLP

(57) ABSTRACT

A method for operating a real-time control system comprising a first system configured to generate an information signal and a second system configured to use the information signal, wherein the second system comprises a first buffer for storing a previously received information signal. The method comprising: transmitting, by the first system, a first communication packet comprising the first information signal and generating, by the second system, a predicted first information signal for use in the first time slot. The predicted first information signal being generated by: retrieving the previously received information signal from the first buffer; generating a first prediction using a short-term predictor; and concurrently generating a second prediction using a long-term predictor; and setting the predicted first information signal equal to the first prediction unless the second prediction is available. The method further comprising using the predicted first information signal in response to determining that the first information signal was not received by the second system in the first time slot.

20 Claims, 25 Drawing Sheets

(56) References Cited

U.S. PATENT DOCUMENTS

| | | | |
|---|---|---|---|
| 2014/0106801 A1* | 4/2014 | Tamizhmani | H04W 24/02 |
| | | | 455/501 |
| 2019/0034830 A1* | 1/2019 | Burangulov | G06F 16/953 |
| 2019/0271979 A1 | 9/2019 | Michael et al. | |
| 2020/0192336 A1* | 6/2020 | Wang | G05B 13/042 |
| 2020/0320419 A1* | 10/2020 | Guo | G06N 3/0454 |
| 2021/0150407 A1* | 5/2021 | Xu | G06N 5/02 |
| 2021/0295204 A1* | 9/2021 | Bhide | G06N 20/00 |

OTHER PUBLICATIONS

Bo Chang, et al. "Dynamic Wireless QoS Analysis for Real-Time Control in URLLC", 2018 IEEE Globecom Workshops (GC Workshops), 2018, doi: 10.1109/GLOCOMW.2018.8644110, 5 pages.

\* cited by examiner

EDGE-INTELLIGENCE FOR STABILITY GUARANTEED REAL-TIME CONTROL SYSTEMS

FIELD

Embodiments described herein relate generally to a method for operating a real-time control system and a real-time control system.

BACKGROUND

Real-Time Control Systems (RTCSs) are used to control a range of processes across a range of industries. For example, Real-Time Control Systems (RTCSs) can be used to enable flexible operation of equipment and facilitate intelligent automation in a number of different fields including manufacturing, oil and gas, and the nuclear industry to name but a few. In general Real-Time Control Systems (RTCSs) comprise a number of different modules (e.g. controllers, sensors and actuators) connected together by a communication system, through which sensing and control information is exchanged to achieve an objective. A Real-Time Control System (RTCS) may operate without human involvement (e.g. a conventional Networked Control System (NCS)). Alternatively, a human user may be a key component of the control loop (e.g. to provide an input for teleoperation of a mechanical arm or a surgical apparatus).

Reliable communication between the various modules (e.g. controllers, sensors and actuators) is important in Real-Time Control Systems (RTCSs), especially where the Real Time Control System (RTCS) has a safety critical application. In the past various wired communication techniques (e.g. Ethernet, power line communications, and token bus) have been used to exchange information amongst the various modules. However, this approach lacks flexibility. To this end, wireless technologies (e.g. WiFi, 4G-LTE, and 5G) are seen as potential communication technologies that can improve the flexibility and mobility of Real-Time Control System (RTCS) deployments.

However, most existing wireless communication protocols have been designed to serve data networks, as opposed to control networks. Data networks generally generate large packets that can tolerate a relatively high delay and packet loss.

In contrast, control networks mainly generate a large number of small packets that are more sensitive to instability and latency. Furthermore, a high rate of information exchange is generally expected for Real-Time Control Systems (RTCSs) having mission critical applications in order to satisfy the stability and transparency requirements of the use-case. For example, teleoperation applications can require an exchange rate of messages greater than 1 kHz. This requirement can exceed the capabilities of some wireless technologies. Finally, wireless networks are often used for different purposes at the same time. Where a Real-Time Control System (RTCS) communicates over a shared media network it is inevitable that some packet loss and delay will be introduced, thereby degrading the performance of the Real-Time Control System (RTCS) and even causing instability.

Model Predictive Control (MPC) has previously been proposed in order to facilitate smooth and stable control of Real-Time Control Systems (RTCS) under these limitations. In Model Predictive Control (MPC) a predictor is located in a slave device to predict forthcoming control signals. Consequently, if a control signal is corrupted in transmission or not delivered, the predicted control signal can be used as a control signal to control the actuator. Model Predictive Control (MPC) systems generally predict the near-future trend of real-time time-series data using classical time series analysis tools.

However, the predicative capabilities of these techniques are limited and cannot generally fulfill the requirements of stable Model Predictive Control (MPC) in emerging Real-Time Control Systems (RTCSs) including fully immersive teleoperation and multi-user augmented/virtual/mixed reality. In particular, the classical prediction techniques cannot accurately capture the long-term features of time series data. Furthermore, improving the prediction accuracy of known techniques generally involves employing a more complex predictor with a larger execution delay. However, a large execution delay is not suitable for critical real-time applications. Finally, emerging human-in-the-loop (HITL) applications (e.g. telesurgery) can benefit from bi-direction prediction (i.e. predicting a feedback signal from a slave device as well as predicting a control signal from a master device). However, known Model Predictive Control (MPC) systems provide no solution for this.

In light of the above, a new approach to Model Predictive Control (MPC) in Real-Time Control Systems (RTCS) is required.

Arrangements of the embodiments will be understood and appreciated more fully from the following detailed description, made by way of example only and taken in conjunction with drawings in which.

DETAILED DESCRIPTION

Figure 1:
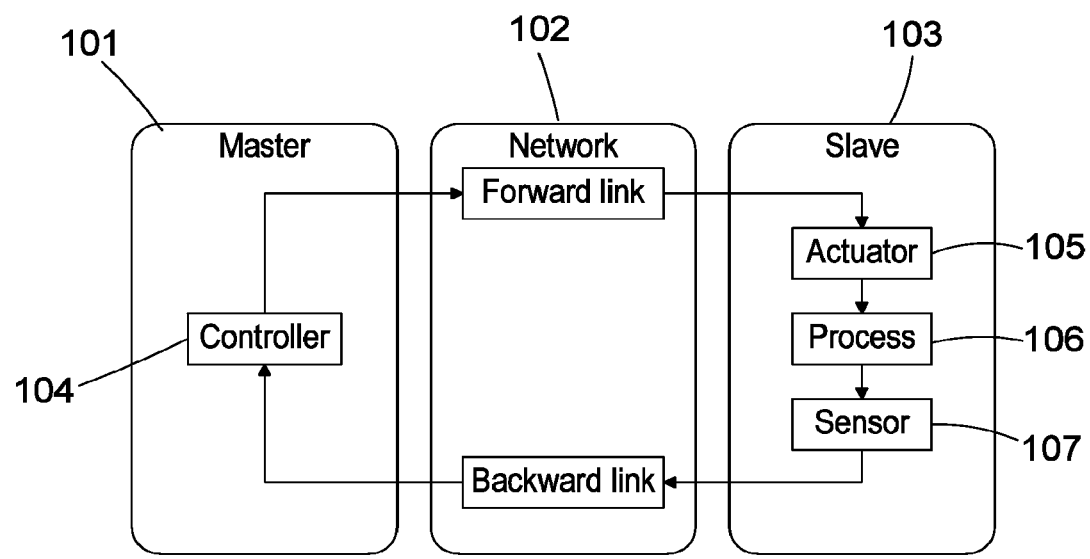
FIG. 1 shows a block diagram of a known Real-Time Control System (RTCS)

According to an embodiment there is provided a method for operating a real-time control system. The real-time control system comprises a first system configured to generate an information signal, a second system configured to use the information signal, wherein the second system comprises a first buffer for storing a previously received information signal and a communication link between the first system and the second system. The method comprises generating, by the first system, a first information signal for use in a first time slot, transmitting, by the first system, a first communication packet via the communication link, the first communication packet comprising the first information signal, generating, by the second system, a predicted first information signal for use in the first time slot, by retrieving the previously received information signal from the first buffer, generating a first prediction based on the previously received information signal using a short-term predictor and concurrently generating a second prediction based on the previously received information signal using a long-term predictor, wherein the long-term predictor has a higher complexity and execution delay relative to the short-term predictor and setting the predicted first information signal equal to the first prediction unless the second prediction is available. The method further comprises using, by the second system, the predicted first information signal in response to determining that the first information signal was not received by the second system in the first time slot.

In an embodiment the first information signal is a control signal.

In an embodiment using the predicted first information signal comprises controlling an actuator based on the predicted first information signal.

In an embodiment the method further comprises using, by the second system, the first information signal in response to determining that the first informational signal was received by the second system in the first time slot.

In an embodiment the first buffer is configured to store a plurality of previously received information signals and wherein the first prediction and the second prediction are generated based on the plurality of previously received information signals.

In an embodiment the communication link is a wireless communication link.

In an embodiment the second system is configured to store the first information signal in the first buffer in response to receiving the first information signal.

In an embodiment the method further comprises generating a plurality of other short-term predictions using a short-term predictor and generating a plurality of other long-term predictions using the long-term predictor, wherein a number of predictions in the plurality of other short-term predictions equals m−1 and the number of predictions in the plurality of other long-term predictions equals l−1, wherein l is greater than m. Optionally, l and m are predetermined.

In an embodiment the plurality of other short-term predictions and the plurality of other long-term predictions are generated based on the previously received information signal.

In an embodiment the method further comprises generating, by the first system, a second information signal for use in a second time slot; the second time slot being after the first time slot and generating, by the second system, a predicted second information signal for use in the second time slot, by generating a third prediction based on the previously received information signal using the short-term predictor and concurrently generating a fourth prediction based on the previously received information signal using the long-term predictor and setting the predicted second information signal equal to the third prediction unless the fourth prediction is available. The method further comprises using, by the second system, the predicted second information signal in response to determining that the second information signal was not received by the second system in the second time slot.

In an embodiment the first system generates information signals at a first rate and transmits communication packets at a second rate less than the first rate. The method further comprises packing a number of information signals into the first communication packet before transmitting the first communication packet, wherein the number of information signals is less than or equal to the first rate divided by the second rate.

In an embodiment the first communication packet comprises the first information signal and the second information signal. The method further comprises storing the first information signal and the second information signal in the first buffer in response to receiving the first communication packet.

In an embodiment the first system generates information signals at a first rate and transmits communication packets at a second rate greater than or equal to the first rate and the method further comprises: packing a number of information signals into the first communication packet before transmitting the first communication packet, wherein the number of information signals equals a predetermined bundling factor.

In an embodiment the information signals packed into the first communication packet are the n most recently generated information signals, where n is the predetermined bundling factor.

In an embodiment the number of information signals is the lower of the predetermined bundling factor and the number of information signals that have been generated.

In an embodiment the first system comprises a second buffer for storing a previously generated information signal and the method further comprises: storing, by the first system, the first information signal in the second buffer; setting, by the second system, a bundling factor for the second time slot equal to a bundling factor for the first time slot incremented by one in response to determining that that the first information signal was not received by the second system in the first time slot; transmitting, by the second system, an acknowledgement message to the first system in the first time slot, the acknowledgement message comprising the bundling factor for the second time slot; and in response to receiving the acknowledgement message: transmitting, by the first system, a second communication packet via the communication link, the second communication packet comprising: the second information signal; and at least a copy of the first information signal.

In an embodiment the second communication packet comprises a number of previous information signals equal to the bundling factor for the second time slot.

In an embodiment the bundling factor for the first time slot equals zero.

In an embodiment the bundling factor indicates a number of information signal transmissions that were not received by the second system.

In an embodiment the acknowledgment message is an ACK message.

In an embodiment the method further comprises: setting the bundling factor for the second time slot equal to zero in response to determining that the first information signal was received by the second system in the first time slot; and clearing, by the first system, the second buffer in response to receiving the acknowledgment message comprising the bundling factor for the second time slot equaling zero.

In an embodiment the acknowledgment message is a NACK message.

In an embodiment the first system comprises a controller, the second system comprises an actuator, and wherein the first information signal is a command generated by the controller.

In an embodiment the first system comprises a sensor, the second system comprises a controller, and wherein the first information signal is a feedback signal generated by the sensor.

In an embodiment the method further comprises generating, by the second system, a third information signal for use in the first time slot; and transmitting, by the second system, a third communication packet via the communication link, the third communication packet comprising the third information signal.

In an embodiment the third information signal is a feedback signal.

In an embodiment the second system further comprises a third buffer for storing a previously generated information signal; and the second prediction generated using the long-term predictor is based on the previously received information signal and the previously generated information signal.

In an embodiment the previously generated information signal is a previously generated feedback signal and the previously received information signal is a previously received control command.

In an embodiment the previously generated information signal is a previously generated control command and the previously received information signal is a previously received feedback signal.

In an embodiment the first system further comprises a fourth buffer for storing a previously received information signal and the method further comprises: generating, by the first system, a predicted third information signal for use in the first time slot, by: retrieving the previously received information signal from the fourth buffer; generating a fifth prediction based on the previously received information signal using a second short-term predictor; concurrently generating a sixth prediction based on the previously received information signal using a second long-term predictor, wherein the second long-term predictor has a higher complexity and execution delay relative to the short-term predictor; and setting the predicted third information signal equal to the fifth prediction unless the sixth prediction is available. The method further comprising: using, by the first system, the predicted third information signal in response to determining that the third information signal was not received by the first system in the first time slot.

In an embodiment the long-term predictor comprises a Recurrent Neural Network (RNN).

In an embodiment the short-term predictor comprises a time-series analysis model.

In an embodiment the short-term predictor comprises a Vector Autoregressive (VAR) model.

In an embodiment the method further comprises generating, by the second system, a fourth information signal for use in the second time slot; setting, by the second system, a second bundling factor for the second time slot equal to a second bundling factor for the first time slot incremented by one, in response to determining that that the first information signal was not received by the second system in the first time slot; transmitting, by the second system, a fourth communication packet comprising the fourth information signal and the second bundling factor; and in response to receiving the fourth communication packet: transmitting, by the first system, a fifth communication packet via the communication link. Wherein the fifth communication packet comprises: a fifth information signal for use in a third time slot; and at least a copy of the first information signal.

In an embodiment the fifth communication packet comprises a number of previous information signals equal to the second bundling factor for the second time slot.

In an embodiment the first buffer comprises: a training sample comprising a plurality of successive information signals; and the long-term predictor comprises: a training machine learning model and a predictive machine learning model. The method further comprising: updating the training machine learning model by: retrieving the training sample from the first buffer; separating the training sample into an input matrix and a label matrix; generating, by the training machine learning model, a predicted sixth information signal based on the input matrix; determining an average loss based on a difference between the predicted sixth information signal and at least part of the label matrix; and updating the training machine learning model based on the average loss.

In an embodiment the method further comprises updating the predictive machine learning model based on the average loss.

In an embodiment updating the training machine learning model further comprises using the average loss in a gradient descent algorithm.

In an embodiment the label matrix comprises successive information signals received after the information signals in the input matrix.

In an embodiment the training machine learning model is updated in response to receiving an instruction to update the long-term predictor.

In an embodiment the method further comprises determining a first prediction accuracy of the predictive machine learning model; determining a second prediction accuracy of the training machine learning model; and updating the predictive machine learning model with weights of the training machine learning model in response to determining that the second prediction accuracy is greater than the first prediction accuracy.

In an embodiment the first buffer comprises: a training sample comprising a plurality of successive information signals; and the long-term predictor comprises: a training machine learning model and a predictive machine learning model. The method further comprising: disabling an output of the long-term predictor such that only an output of the short-term predictor is available to the second system; initializing the training machine learning model with random weights; separating the training sample into an input matrix and a label matrix; determining an accuracy of the training machine learning model based on the input matrix and the label matrix; determining an accuracy of the short-term predictor based on the input matrix and the label matrix; and in response to determining that the accuracy of the training machine learning model is higher than the accuracy of the short-term predictor: setting weights of the predictive machine learning model equal to weights of the training machine learning model; and enabling the output of the long-term predictor such that an output of the predictive machine learning model is available to the second system.

In an embodiment determining an accuracy of the training machine learning model based on the input matrix and the label matrix comprises generating, by the training machine learning model, a predicted command signal based on the input matrix.

In an embodiment determining an accuracy of the short-term predictor based on the input matrix and the label matrix comprises generating, by the short term predictor, a second predicted command signal, based on the input matrix.

In an embodiment the method further comprises updating the weights of the training machine learning model in response to determining that the accuracy of the training machine learning model is less than the accuracy of the short-term predictor.

According to a second aspect there is provided a real-time control system comprising: a first system configured to generate an information signal; a second system configured to use the information signal, wherein the second system comprises a first buffer for storing a previously received information signal; and a communication link between the first system and the second system. Wherein the first system is configured to: generate a first information signal for use in a first time slot; transmit a first communication packet via the communication link, the first communication packet comprising the first information signal. The second system configured to generate a predicted first information signal for use in the first time slot, by: retrieving the previously received information signal from the first buffer; generating a first prediction based on the previously received information signal using a short-term predictor; and concurrently generating a second prediction based on the previously received information signal using a long-term predictor, wherein the long-term predictor has a higher complexity and execution delay relative to the short-term predictor; and setting the predicted first information signal equal to the first prediction unless the second prediction is available. The second system further configured to use the predicted first information signal in response to determining that the first information signal was not received by the second system in the first time slot.

In an embodiment the second system is configured to store the first information signal in the first buffer in response to receiving the first information signal.

In an embodiment the first system is further configured to: generate a second information signal for use in a second time slot; the second time slot being after the first time slot, and generate a predicted second information signal for use in the second time slot, by: generating a third prediction based on the previously received information signal using the short-term predictor; and concurrently generating a fourth prediction based on the previously received information signal using the long-term predictor; and setting the predicted second information signal equal to the third prediction unless the fourth prediction is available. The second system further configured to use the predicted second information signal in response to determining that the second information signal was not received by the second system in the second time slot.

In an embodiment the first system is configured to generate information signals at a first rate, to transmit communication packets at a second rate less than the first rate, and to pack a number of information signals into the first communication packet before transmitting the first communication packet, wherein the number of information signals is less than or equal to the first rate divided by the second rate.

In an embodiment the first communication packet comprises the first information signal and the second information signal, the second system further configured to store the first information signal and the second information signal in the first buffer in response to receiving the first communication packet.

In an embodiment the first system is configured to generate information signals at a first rate, to transmit communication packets at a second rate greater than or equal to the first rate and to pack a number of information signals into the first communication packet before transmitting the first communication packet, wherein the number of information signals equals a predetermined bundling factor.

In an embodiment the first system comprises a second buffer for storing a previously generated information signal and is configured to store the first information signal in the second buffer. The second system further configured to: set a bundling factor for the second time slot equal to a bundling factor for the first time slot incremented by one in response to determining that that the first information signal was not received by the second system in the first time slot; and transmit an acknowledgement message to the first system in the first time slot, the acknowledgement message comprising the bundling factor for the second time slot. Wherein the first system is further configured to: transmit a second communication packet via the communication link in response to receiving the acknowledgement message wherein, the second communication packet comprising: the second information signal; and at least a copy of the first information signal.

In an embodiment the second system is configured to set the bundling factor for the second time slot equal to zero in response to determining that the first information signal was received by the second system in the first time slot; and the first system is configured to clear the second buffer in response to receiving the acknowledgment message comprising the bundling factor for the second time slot equaling zero.

In an embodiment the first system comprises a controller, the second system comprises an actuator, and wherein the first information signal is a command generated by the controller.

In an embodiment the first system comprises a sensor, the second system comprises a controller, and wherein the first information signal is a feedback signal generated by the sensor.

In an embodiment the second system is further configured to: generate a third information signal for use in the first time slot; and transmit a third communication packet via the communication link, the third communication packet comprising the third information signal.

In an embodiment the second system further comprises a third buffer for storing a previously generated information signal; and the second prediction generated using the long-term predictor is based on the previously received information signal and the previously generated information signal.

In an embodiment the first system further comprises a fourth buffer for storing a previously received information signal, and the first system is further configured to: generate a predicted third information signal for use in the first time slot, by: retrieving the previously received information signal from the fourth buffer; generating a fifth prediction based on the previously received information signal using a second short-term predictor; concurrently generating a sixth prediction based on the previously received information signal using a second long-term predictor, wherein the second long-term predictor has a higher complexity and execution delay relative to the short-term predictor; and setting the predicted third information signal equal to the fifth prediction unless the sixth prediction is available. The first system further configured to: use the predicted third information signal in response to determining that the third information signal was not received by the first system in the first time slot.

In an embodiment the long-term predictor comprises a Recurrent Neural Network (RNN).

In an embodiment the short-term predictor comprises a time-series analysis model.

In an embodiment the second system is further configured to generate a fourth information signal for use in the second time slot; set a second bundling factor for the second time slot equal to a second bundling factor for the first time slot incremented by one, in response to determining that that the first information signal was not received by the second system in the first time slot; and transmit a fourth communication packet comprising the fourth information signal and the second bundling factor. Wherein the first system is further configured to: transmit a fifth communication packet via the communication link in response to receiving the fourth communication packet, the fifth communication packet comprising: a fifth information signal for use in a third time slot; and at least a copy of the first information signal.

In an embodiment the first buffer comprises: a training sample comprising a plurality of successive information signals; and the long-term predictor comprises: a training machine learning model and a predictive machine learning model. In this embodiment the second system is further configured to: update the training machine learning model by: retrieving the training sample from the first buffer; separating the training sample into an input matrix and a label matrix; generating, by the training machine learning model, a predicted sixth information signal based on the input matrix; determining an average loss based on a difference between the predicted sixth information signal and at least part of the label matrix; and updating the training machine learning model based on the average loss.

In an embodiment the second system is further configured to: determine a first prediction accuracy of the predictive machine learning model; determine a second prediction accuracy of the training machine learning model; and update the predictive machine learning model with weights of the training machine learning model in response to determining that the second prediction accuracy is greater than the first prediction accuracy.

In an embodiment the first buffer comprises: a training sample comprising a plurality of successive information signals; and the long-term predictor comprises: a training machine learning model and a predictive machine learning model. In this embodiment the second system is further configured to: disable an output of the long-term predictor such that only an output of the short-term predictor is available to the second system; initialize the training machine learning model with random weights; separate the training sample into an input matrix and a label matrix; determine an accuracy of the training machine learning model based on the input matrix and the label matrix; determine an accuracy of the short-term predictor based on the input matrix and the label matrix; and in response to determining that the accuracy of the training machine learning model is higher than the accuracy of the short-term predictor: set weights of the predictive machine learning model equal to weights of the training machine learning model; and enable the output of the long-term predictor such that an output of the predictive machine learning model is available to the second system.

In an embodiment the second system is further configured to: update the weights of the training machine learning model in response to determining that the accuracy of the training machine learning model is less than the accuracy of the short-term predictor.

In an embodiment there is provided a system comprising a first buffer for storing received information signals, a short-term predictor and a long-term predictor. The system configured to generate a predicted first information signal for use in a first time slot, by retrieving a previously received information signal from the first buffer, generating a first prediction based on the previously received information signal using a short-term predictor and generating a second prediction based on the previously received information signal using a long-term predictor, wherein the long-term predictor has a higher complexity and execution delay relative to the short-term predictor. The system is further configured to set the predicted first information signal equal to the first prediction unless the second prediction is available and use the predicted first information signal in response to determining that an information signal relating to a current time slot was not received by the system.

FIG. 1 shows a block diagram of a known Real-Time Control System (RTCS). FIG. 1 shows a Real-Time Control System (RTCS) comprising a master side 101 communicatively coupled to a slave side 103 via a network 102. The master side 101 comprises a controller 104 for transmitting control signals, via the network 102, to the slave side 103. In FIG. 1 the controller 104 is configured to receive feedback signals, via the network 102, from the slave side 103.

The slave side 103 comprises an actuator 105 configured to respond (e.g. by actuating a mechanism) to the received control signals, thereby affecting a process 106 (e.g. the movement of a mechanical arm to pick up an object). The slave side 103 also comprises a sensor 107 to observe the process 106 and generate a feedback signal, which is communicated via the network 102 to the controller 104, which can then use this feedback signal to generate future control signals.

Figure 2:
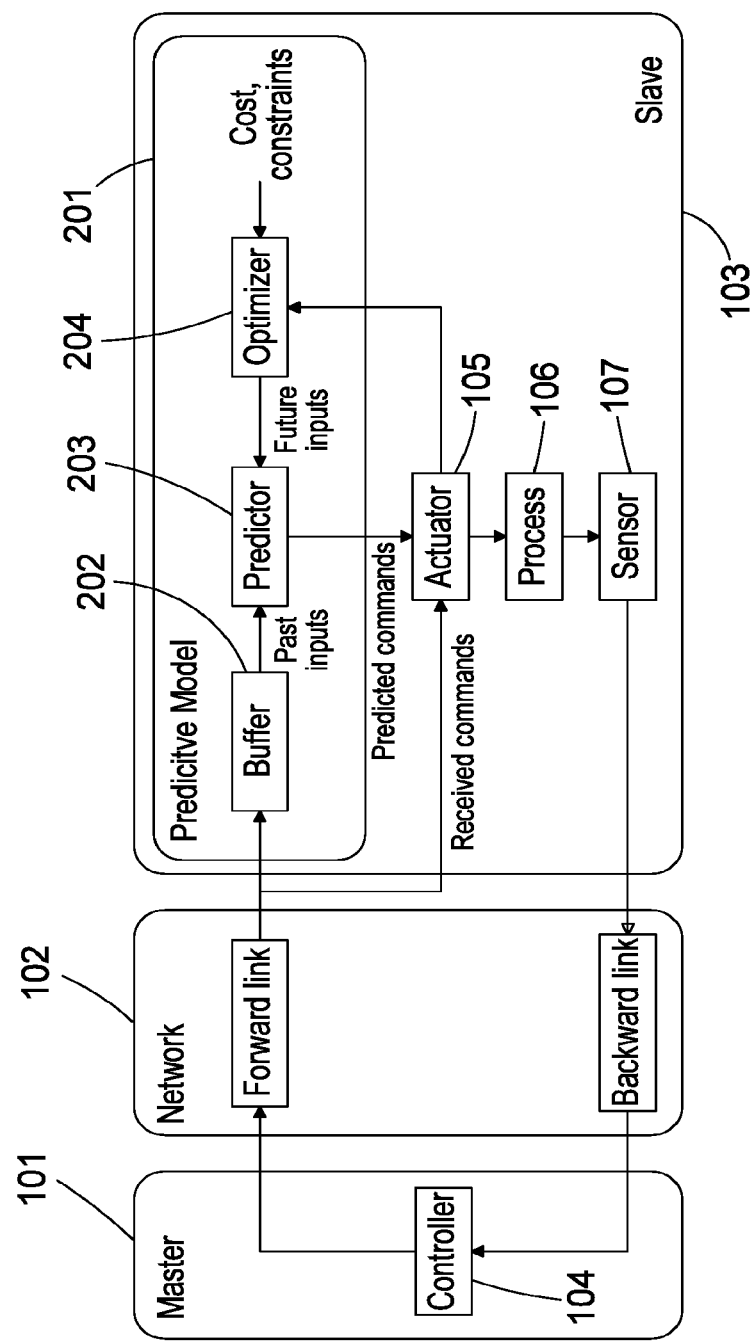
FIG. 2 shows a block diagram of a known Real-Time Control System (RTCS) comprising Model Predictive Control (MPC)

FIG. 2 shows a block diagram of a known Real-Time Control System (RTCS) comprising Model Predictive Control (MPC). In FIG. 2, the slave side 103 comprises a predictive system 201. The predictive system 201 is implemented on a Mobile Edge Computing (MEC) server and comprises: a buffer 202 for storing historical control commands transmitted by the controller 104, and a predictor 203 for predicting a forthcoming states of the controller 104 (e.g. as represented by control commands) based on the collected historical data. The predictor 203 is configured to predict the future evolution of the system based on the current and previous states of the system. In this instance, prediction of future commands can be viewed as an optimisation problem that is repeated every sampling step. The sampling step being a time slot within which receipt of a control command is expected. For each sampling step, an optimizer 204 calculates model parameters based on cost requirements and constraints. These model parameters, alone with the past inputs are used by the predictor 203 to predict a future control command.

In FIG. 2 a control command received via the network 102 is communicated to both the actuator 105 and the buffer 202. The received control command is stored in the buffer 202 and is used by the predictor 203 to predict future control commands.

The quality of the network 102 is limited, due to the transmission distance, bandwidth and burden of transporting traffic for other users. As a result, it is foreseeable that uncertainties in packet loss and latency will occur. Packet loss or a communication delay results in the control command not being received in time by the slave side 103. In the absence of a received control command, the actuator 105 uses the predicted command generated by the predictor 203. Using a predictor 203 to predict a control commands is different to Real-Time Control Systems (RTCS) that do not include Model Predictive Control (MPC) where, in the absence of a received control command, the actuator uses a null (i.e. zero) input command or uses the previously received control command.

By using a predictive system 201 the slave side 103 can mitigate some of the problems, in particular delay and packet loss, that are introduced by implementing the network 102 using a wireless communication link. However, as we discussed above there are various issues with known Model Predictive Control (MPC). Not least, that classical prediction techniques used by the predictor 203 cannot accurately capture the long-term features of time series data. In addition, improving the prediction accuracy of known Model Predictive Control (MPC) techniques generally involves employing a more-complex predictor with a larger execution delay. However, this is not suitable for critical real-time applications.

Furthermore, emerging human-in-the-loop (HITL) applications (e.g. telesurgery) can benefit from bi-direction prediction (i.e. predicting a feedback signal from a slave device as well as predicting a control signal from a master device). However, the predictive system 201 in FIG. 2 only predicts the received command. There is no functionality in FIG. 2 that predicts feedback signals generated by the slave side 103. Bi-directional prediction (i.e. predicting control signals and predicting feedback signal) could benefit a number of emerging human-in-the-loop (HITL) applications. An example use-case for bi-directional prediction is telesurgery where a predictor 203 in the slave side 103 predicts control commands generated by the actions of a user (e.g. a surgeon) and the master side 101 predicts real-time feedback signals (e.g. video or haptic signals) to allow a user to experience the effects of their actions.

Figure 3:
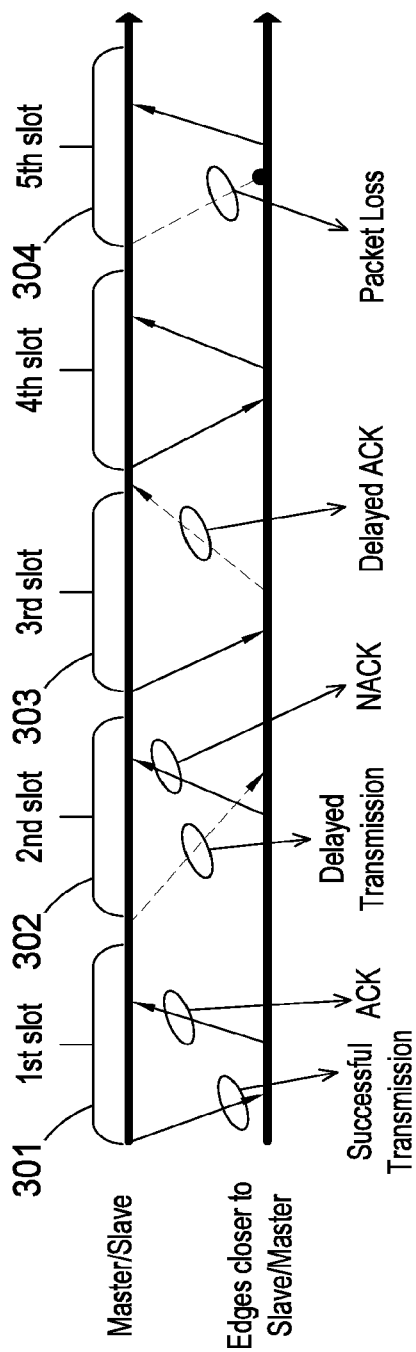
FIG. 3 shows a communication schedule in a slotted Real-Time Control System (RTCS) according to an embodiment.

FIG. 3 shows a communication schedule in a slotted Real-Time Control System (RTCS) according to an embodiment. In FIG. 3 the master side 101 and the slave side 102 communicate according to a communication schedule. In the communication schedule time is divided into a plurality of time slots, wherein each timeslot has a duration that at least equals a sum of: a time taken to communicate a control signal or a feedback signal between the master side 101 and the slave side 102, and a time taken to communicate an acknowledgment in response.

The frequency of the timeslots represents a sampling rate of the Real-Time Control System (RTCS). In a given slot the master side 101 and the slave side 103 transmit a control or feedback signal to an edge server (e.g. a Mobile Edge Computing (MEC) server) communicatively coupled to the recipient (e.g. the slave side 103 and the master side 101 respectively). In response to receiving the control or feedback signal, the edge server associated with the slave side 103 or the master side 101 respectively responds with an acknowledgement (ACK) message when the control or feedback signal has been successfully received and a negative-acknowledgement (NACK) message when the control or feedback signal has been unsuccessfully received.

As discussed above, the quality of a wireless network can vary over time. The effect of this uncertainty is shown in the message exchanges in FIG. 3. In a first time slot 301 a message transmitted by the master and/or slave side is successfully received by an edge server associated with the slave and/or master side respectively. Consequently, an acknowledgement (ACK) is transmitted by the edge server communicatively connected to the intended recipient of the control or feedback signal. In a second time slot 302 receipt of the control/feedback signal is delayed due to the variability of the network 102. Consequently, the edge server associated with the master/slave system transmits a negative-acknowledgment (NACK) to indicate that no control signal or feedback signal was received in the present timeslot. As will be noted, in FIG. 3 the transmission from the master/slave side is received by the edge server during the second timeslot 302, however it is received after the time (e.g. half-way through the timeslot) at which a decision is made as to whether send an acknowledgment or negative-acknowledgment message.

The uncertainty in the network 102 can also effect the communication link from the edge server. In a third time slot 303 the acknowledgement for a successfully received control/feedback signal is delayed. In additional to delays, the variability of the communication link could result in a packet loss. An example of this is shown in a fifth timeslot 304.

If each time slot is small enough (i.e. the sampling rate is high), then it can be assumed that the control or feedback signals are time-correlated along a small number of successive time slots. As a result, it is possible to predict a forthcoming control or feedback signal based on information from the previous time slots. Consequently, when the control or feedback signals are erroneously decoded, delayed, or lost (e.g. in time slots 2 and 5), a predictor can be used to generate a predicted signal for use by the master or slave sides.

The techniques disclosed below are used in the context of a unidirectional Real-Time Control System (RTCS). An example of a unidirectional control system is where a master side transmits command signals (e.g. position and force) to the slave side for interaction with the physical environment in real-time. Another example of a unidirectional control system is where a slave system delivers feedback signals (e.g. visual, auditory and haptic) to a master system. For simplicity the techniques described below are only discussed from the perspective of improving command signal performance on the slave side of a Real-Time Control System (RTCS). However, for the avoidance of doubt it is emphasized that the techniques could be used in the master system for improving feedback performance, or could be used in a bi-directional system, in both the master and slave system, for predicting both feedback signals and control signals respectively.

Figure 4:
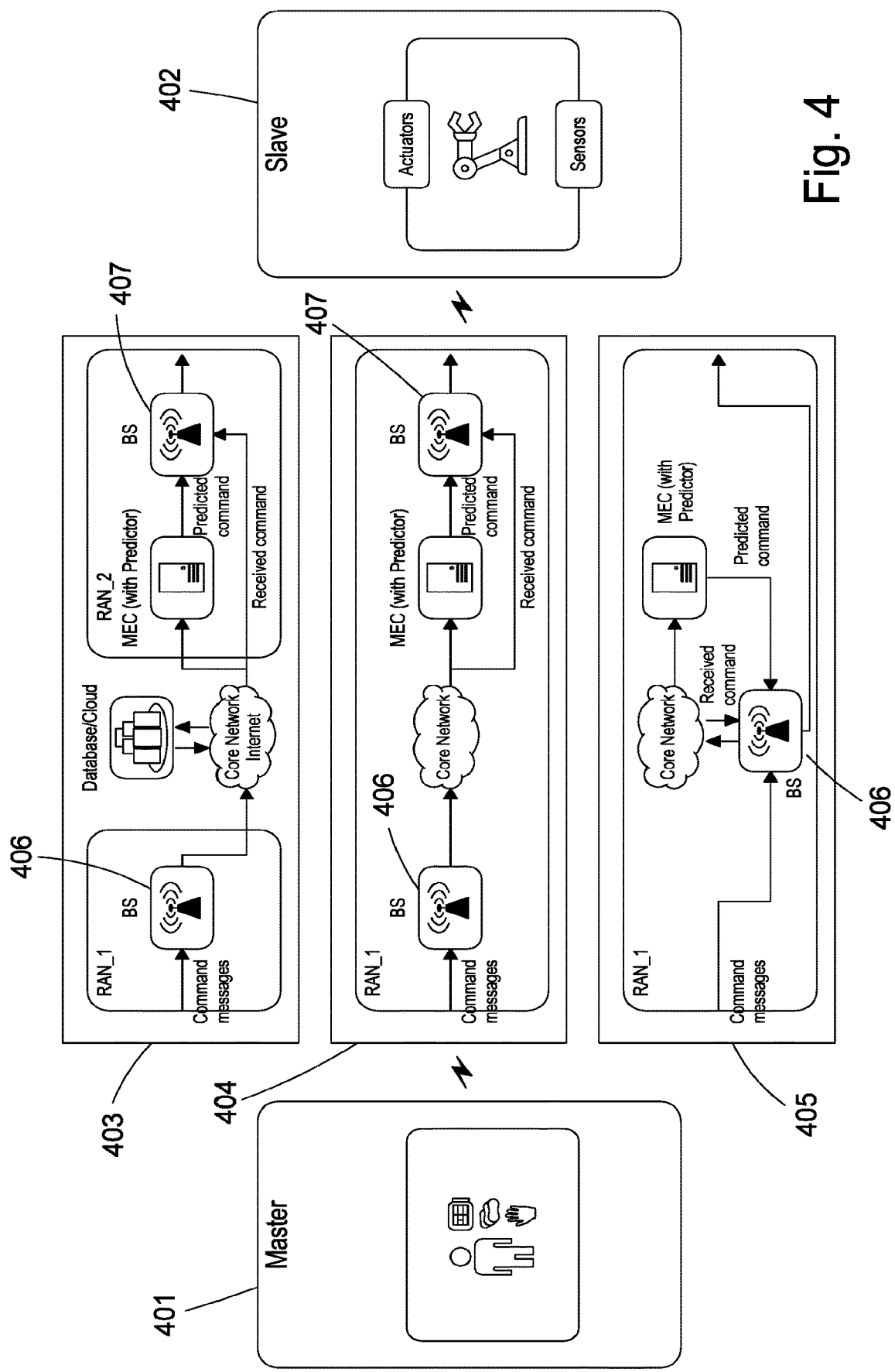
FIG. 4 shows alternative implementations of a unidirectional Real-Time Control System (RTCS) according to an embodiment.

FIG. 4 shows alternative implementations of a unidirectional Real-Time Control System (RTCS) according to an embodiment. FIG. 4 shows a master system 401 communicatively coupled to a slave system 402 via a network. FIG. 4 shows a first implementation 403, a second implementation 404, and a third implementation 405 of the network.

In the first implementation 403 the master system 401 is communicatively coupled to a first base station 406 in a first Radio Access Network (RAN_1). The first base station 406 is communicatively coupled to a core network/internet. The core network is connected to a second base station 407 and a Mobile Edge Computing (MEC) server. The Mobile Edge Computing (MEC) server comprises a predictor for predicting command signals transmitted by the master system 401. In this example, the master side comprises the master system 401 and the first base station 406, while the slave side comprises the slave system 402, the second base station 407 and the Mobile Edge Computing (MEC) server.

Optionally, the predictive models used by the predictor are trained at and by the Mobile Edge Computing (MEC) server. Optionally, the core network is also connected to a database or a cloud-computing server. In this case, the predictive models are training at and by the central database or cloud-computing server. In the first implementation 403 of the network, the second base station 407 is communicatively coupled to the slave system 402. In the first implementation 403 the Mobile Edge Computing (MEC) server, the second base station 407 and the slave system 402 are part of a second Radio Access Network (RAN_2).

In the second implementation 404 the master system 401 and the slave system 402 are deployed in the first Radio Access Network (RAN_1), but are served by different base stations. That is, in the second implementation 404 the master system 401 is communicatively coupled to the first base station 406 and the slave system 402 is communicatively coupled to the second base station 407. The first base station 406 and the second base station 407 being communicatively coupled via the core network.

In the third implementation 405 the master system 401 and the slave system 402 are deployed in the first Radio Access Network (RAN_1) and share a single base station, i.e. the first base station 406. In this case the first base station 406 forms a part of the master side and the slave side.

Irrespective of the implementation used (i.e. the first implementation 403, the second implementation 404, or the third implementation 405), the processing flow when executing a unidirectional Real-Time Control System (RTCS) with a predictive model for predicting command messages is as follows.

In a first step the master system 401 transmits a command message comprising the control command to the slave system 402. The master system 401 is communicatively coupled to the first base station 406 over a wireless link. In each of the first implementation 403, the second implementation 404, and the third implementation 405 the first base station 406 is connected to the core network over a wired interface. In response to receiving the command signal transmitted by the master system 401, the first base station 406 forwards the received command message over the core network to the slave side.

The core network receives the command message and duplicates the command message to create two copies of the message. A first copy of the command message is transmitted to the Mobile Edge Computing (MEC) server associated with the slave system 402. The first copy of the command message transmitted to the Mobile Edge Computing (MEC) server is subsequently used by the Mobile Edge Computing (MEC) server for training and generating inferences from the predictive model.

A second copy of the command message is transmitted to the base station. Where the first implementation 403 or the second implementation 404 is used to between the master system 401 and the slave system 402, then the second copy of the command message is transmitted to the second base station 407. When the third implementation 405 is used, the second copy of the command message is transmitted to the first base station 406.

As discussed above in relation to FIG. 2, the Mobile Edge Computing (MEC) server generates a predicted command based on previous input commands stored in a buffer. In FIG. 4 the Mobile Edge Computing (MEC) server, comprising the predictor, generates a predicted command for each time slot based on the historically received commands. As a result, the base station (e.g. the second base station 407 in the first implementation 403 and second implementation 404) receives an 'actual' command from the core network and a 'predicted' command signal from the Mobile Edge Computing (MEC) server at each time slot.

The base station in the slave side (i.e. the second base station 407 in the first and second implementations 403, 404 or the first base station in the third implementation 405) is configured to preferentially transmit the 'actual' command to the slave system 402. If the base station determines that the 'actual' command has not been received from the master system 401 (e.g. because the 'actual' command is delayed or lost) then the base station is configured to transmit the 'predicted' command generated by the Mobile Edge Computing (MEC) server. As a result, the slave system 402 receives a command at each timeslot.

Figure 5:
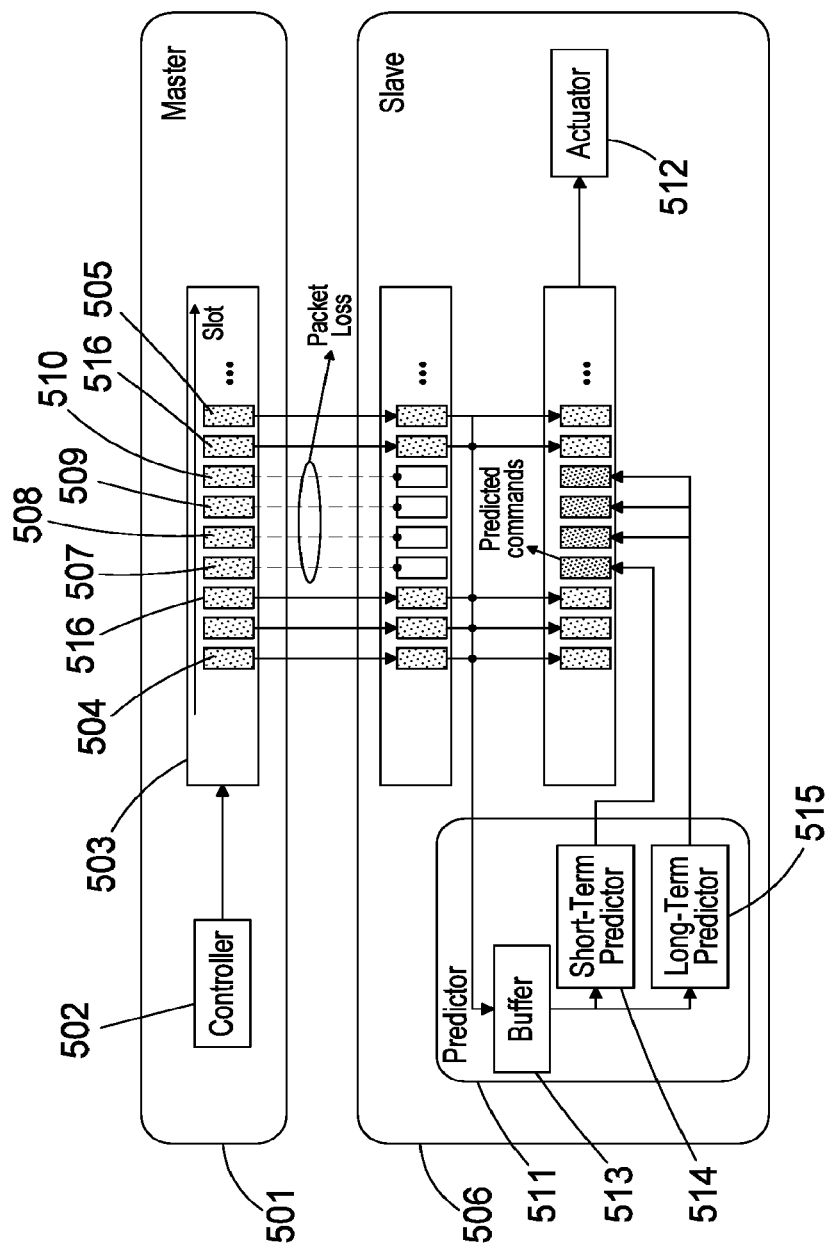
FIG. 5 shows a representation of a Temporal-Adaptive Prediction (TAP) technique for use in a Real-Time Control System (RTCS) according to an embodiment.

FIG. 5 shows a representation of a Temporal-Adaptive Prediction (TAP) technique for use in a Real-Time Control System (RTCS) according to an embodiment. In FIG. 5 a plurality of predictive models with different capabilities and complexities are executed in parallel to generate predicted control commands over differing time horizons. FIG. 5 shows a master side 501 comprising a controller 502 configured to generate control commands. FIG. 5 also shows a timeline of the control commands transmitted by the controller 502. The timeline 503 shows nine control commands transmitted by the controller 502 from a first time slot 504 to a (later) ninth time slot 505.

The control commands generated by the controller 502 are transmitted by the master side 501 to a slave side 506.

As discussed above, the network connecting the master side 501 and the slave side 506 can include a wireless connection that is prone to packet loss. In FIG. 5 the control commands transmitted by the controller 502 in a fourth timeslot 507, a fifth timeslot 508, a sixth timeslot 509 and a seventh timeslot 510 are lost between the master system and the core network (e.g. due to packet loss occurring across a wireless link in the master side).

In the first timeslot 504 a first control command is transmitted by the controller 502. The first control command is received at the core network where two copies of the control command are generated. A first copy of the first control command is transmitted to a predictor 511 in the Mobile Edge Computing (MEC) server. A second copy of the first control command is transmitted to the base station for subsequent transmission to an actuator 512.

The predictor 511 comprises a buffer 513, a short-term predictor 514 and a long-term predictor 515. The short-term predictor 514 has a lower capability and complexity relative to the long-term predictor 515. Consequently, the short-term predictor 514 is only used to predict control signals in the present and the near future. Limiting the prediction horizon of the short-term predictor 514 limits the required size of the prediction model and guarantees that the prediction procedure is completed before timeout by the slave side 506 (i.e. the time at transmission of a negative-acknowledgment to the master side is triggered by the slave side).

Each communication packet received by the predictor 511 is stored in the buffer 513. The short-term predictor 514 receives a feed-forward signal (i.e. an input stimulus to generate an output prediction) in each timeslot that a command is successfully received. In the example of FIG. 5, the short-term predictor 514 receives a feed forward signal in a third time slot 516. The short-term predictor 514 subsequently predicts the control signal for the fourth time slot 507 based on the contents of the buffer 513. When the short-term predictor receives the activation signal it is not yet known whether the predicted signal will be required, since the fourth time slot has not yet started.

When there is no transmission loss, there will be a 'predicted' command and an 'actual' command for each timeslot. In this case, the base station (e.g. the second base station 407 in the first and second implementations 403, 404 in FIG. 4) transmits the 'actual' command to the actuator 512. Since the 'actual' command transmitted in the fourth timeslot is lost in transmission, the only command available at the slave side is the 'predicted' command generated by the short-term predictor 514 in response to an activation signal being received in the third time slot 516. In this case, the 'predicted' fourth command is transmitted to the actuator 512.

Both short-term and long-term predictors 514 and 515 are provide a new prediction every time a new packet is received by the buffer 513. If a packet was missed, neither predictors is triggered. Instead the control is based on the previously predicted control signals. The number of previous predictions made available by the short-term predictor can be fixed, for example at installation time, depending on the circumstances/current requirements. For each triggered slot, the short-term predictor 514 only predicts one or few future commands. The number of slots to be predicted is a system parameter, which guarantees the prediction procedure to be completed within the duration of a single slot. The long-term predictor 515 predicts future commands, in which the number depends on the connectivity stability, and is more than that of the short-term predictor.

The predictor 511 also comprises a long-term predictor 515. The long-term predictor 515 has relatively higher prediction capability and is responsible for predicting signals (e.g. command signals) over a longer time horizon than the short-term predictor 515. In FIG. 5 the long-term predictor generates command predictions for the fifth timeslot 508, the sixth timeslot 509 and the seventh timeslot 510. Since there is no 'actual' command received for these timeslots, the predicted command is communicated to the actuator 512. The command transmitted by the controller 502 in an eighth timeslot 516 is successful transmitted across the network. Consequently, an 'actual' command is available at the base station in the slave side. As a result, the 'actual' command is selected for subsequent transmission. The long-term predictor 515 ceases making any more predictions until it is re-triggered.

Figure 6:
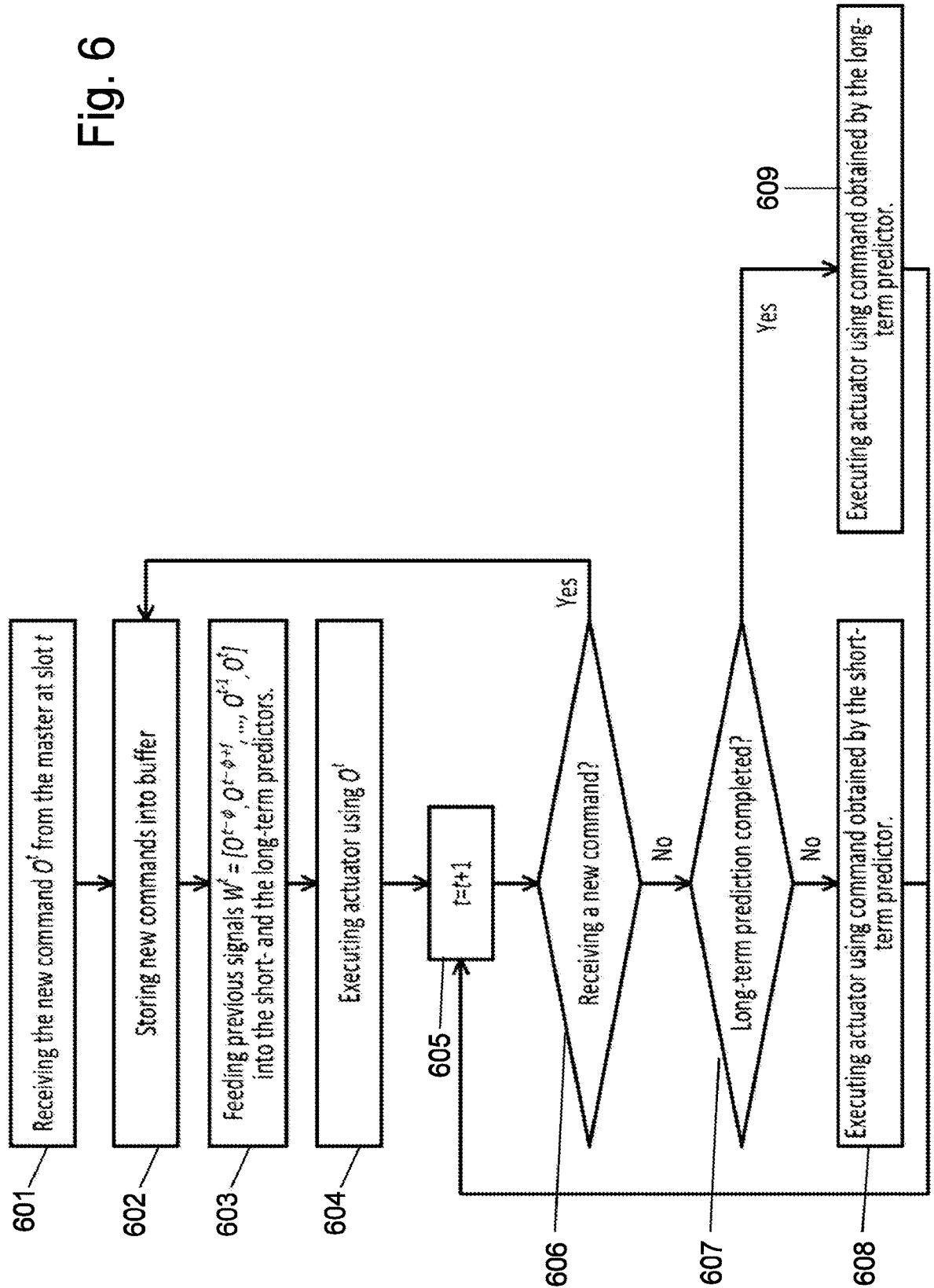
FIG. 6 shows a method of Temporal-Adaptive Prediction (TAP) for use in a Real-Time Control System (RTCS) according to an embodiment.

FIG. 6 shows a method of Temporal-Adaptive Prediction (TAP) for use in a Real-Time Control System (RTCS) according to an embodiment. In a first step 601 a new command, $O^t$, (e.g. a control command) is received at the slave side from the master side at a first timeslot t. The new command, $O^t$, is stored in the buffer 513 in a second step 602. In response to receiving a new command, $O^t$, the short-term predictor 514 and the long-term predictor 515 are triggered (i.e. activated) to predict forthcoming signals. To do this, a set of signals $W^t$ is retrieved from the buffer 513 and fed into both the short-term predictor 514 and the long-term predictor 515 in step 603. The set of signals, $W^t$, comprises each command received over a period of time, $\varphi$, before the new command, $O^t$, was received. The set of signals $W^t = [O^{t-\varphi}, O^{t-\varphi+1}, \ldots, O^{t-1}, O^t]$.

At substantially the same time, the new command, $O^t$, is communicated to the actuator 512 where, upon receipt, the actuator 512 executes actions based on the new command, $O^t$. After receiving a command in the first timeslot, t, the method waits for a timeslot in a fifth step 605 before determining whether a new command has been received in a second timeslot, t+1.

If, in a sixth step 606, it is determined that a new command has been received in the second timeslot t+1, then the method returns to step 602 and re-initialises both the short-term predictor 514 and the long-term predictor 515 based on data received in the period of time, $\varphi$, before the current timeslot t+1 (i.e. command signals between $O^{t-\varphi+1}$ to $O^{t+1}$).

If, in the sixth step 606, it is determined that a new command has not been received in the second timeslot t+1 (e.g. because of packet loss or delay in the transmission link) then a predicted command generated by the predictor 511 is used to control the actuator 512.

In response to determining that a new command has not been received in the second timeslot, t+1, the method proceeds to step 607 where it is determined whether long-term prediction has completed execution. As discussed above, the predictor 511 comprises a short-term predictor 514 and a long-term predictor 515. The short-term predictor 514 is able to generate predictions more quickly owing to its low complexity and capability. However, the accuracy of longer time horizon predictions is lower than the relatively more complex long-term predictor 515. Consequently, where predictions from the long-term predictor 515 are available, it is preferred to use these over predictions generated by the short-term predictor 514. Although, it will initially take longer to generate these predictions due to the increased complexity.

If, in step 607 it is determined that predictions from the long-term predictor 515 are not yet available, then predicted commands generated by the short-term predictor 514 are communicated to, and executed by, the actuator 512 in step 608. If, on the other hand, it is determined in step 607 that predictions from the long-term predictor 515 are available, the method proceeds to step 609 where predicted commands generated by the long-term predictor 515 are communicated to, and executed by, the actuator 512 in step 609.

The method subsequently waits for the next timeslot in step 605, i.e. timeslot t+2, and then determines whether an actual command has been received from the master system in step 606 as discussed above.

In the short-term predictor 514, predictions are made using time series analysis models including, but not limited to, Vector Autoregressive (VAR) and Auto Regressive Integrated Moving Average (ARIMA). These techniques capture inherent "natural" structures in the time series data by learning through partial historical data via unsupervised clustering mechanisms, e.g., hidden variables or cluster state transitions. The learning solely relies on previously undetected patterns in the data set without the requirement of pre-labeling.

In the long-term predictor 515 predictions are made using a supervised learning (SL) model, which attempts to accurately capture the temporal dynamics of the long-memory time series data and the complex correlation among multiple degree-of-freedoms (DoFs). In an embodiment, the long-term predictor 515 comprises a Recurrent Neural Network (RNN) based on the long short-term memory (LSTM) or gated recurrent units (GRU) architectures.

Figure 7:
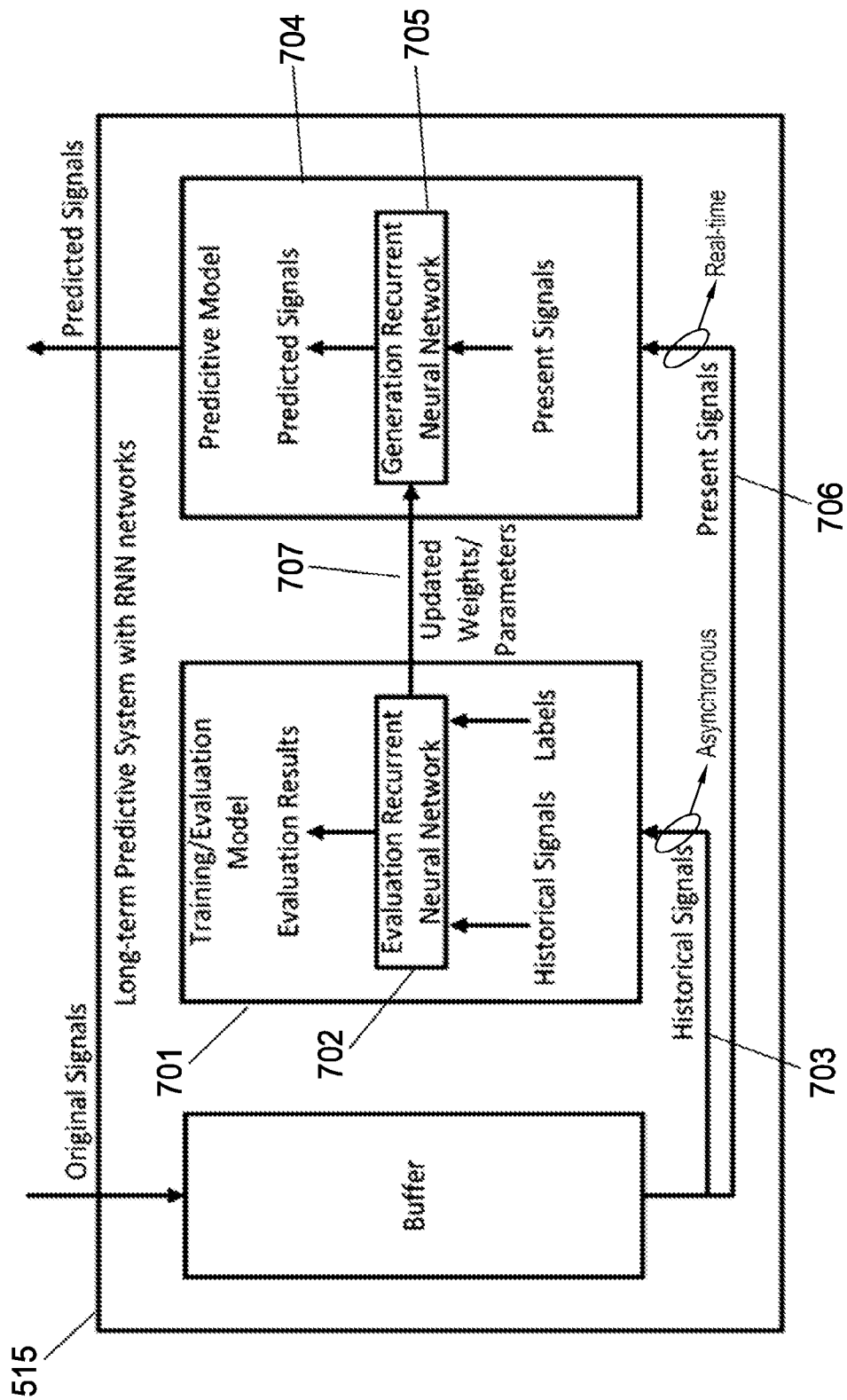
FIG. 7 shows a long-term predictor 515 implemented using a Recurrent Neural Network (RNN) according to an embodiment.

FIG. 7 shows a long-term predictor 515 implemented using a Recurrent Neural Network (RNN) according to an embodiment. At a given time slot, e.g. a first slot t, an original control signal, $O^t$, is received and stored in the buffer. As discussed previously, the control signals, e.g. $O^t$, are transmitted by a master system and communicated over a network. The long-term predictor 515 comprises a training/evaluation model 701 comprising an evaluation Recurrent Neural Network (RNN) 702. Training the evaluation Recurrent Neural Network (RNN) 702 will be discussed in more detail below. However, in essence, historical data 703 from the buffer is used by the training/evaluation model 701 to generate updated weights/parameters 707 which, once considered to generate accurate predictions, are then communicated to a second Recurrent Neural Network (RNN) that generates the predicted commands.

The long-term predictor 515 also comprises a predictive model 704 comprising a generation Recurrent Neural Network (RNN) 705. The generation Recurrent Neural Network (RNN) 705 has the same RNN architecture as the evaluation Recurrent Neural Network (RNN) 702 but intermittently has different parameters up to the point at which it receives updated parameters from the evaluation Recurrent Neural Network (RNN) 702.

As known in the art, a Recurrent Neural Network (RNN) is a class of artificial neural network that generates outputs based on the input, the weights applied to the input and a "hidden" state vector representing a context based on previous inputs and outputs. As a result, the output of a Recurrent Neural Network (RNN) depends on the previous inputs to the model.

The generation Recurrent Neural Network (RNN) 705 is configured to receive updated weights/parameters 707 from the training/evaluation model 701. The generation Recurrent Neural Network (RNN) 705 is further configured to generate a predicted signal (e.g. a predicted command) based on a present signal 706 and the updated weights/parameters 707.

The generation Recurrent Neural Network (RN N) 705 comprises a plurality of layers of Recurrent Neural Network (RNN) cells where the last layer is connected to an output layer comprising a plurality of activation functions e.g. the hyperbolic tangent (tan h) activation function. In an embodiment, each Recurrent Neural Network (RNN) cell has the form of a Long Short Term Memory (LTSM) network. In an alternative embodiment, each Recurrent Neural Network (RNN) cell is a Gated Recurrent Unit (GRU).

FIG. 7 shows a long-term predictor 515 comprising a separate buffer for storing received command signals. However, it will be appreciated that this buffer could be located outside of the long-term predictor 515 and shared with the short-term predictor 514 as shown in FIG. 5

Figure 8:
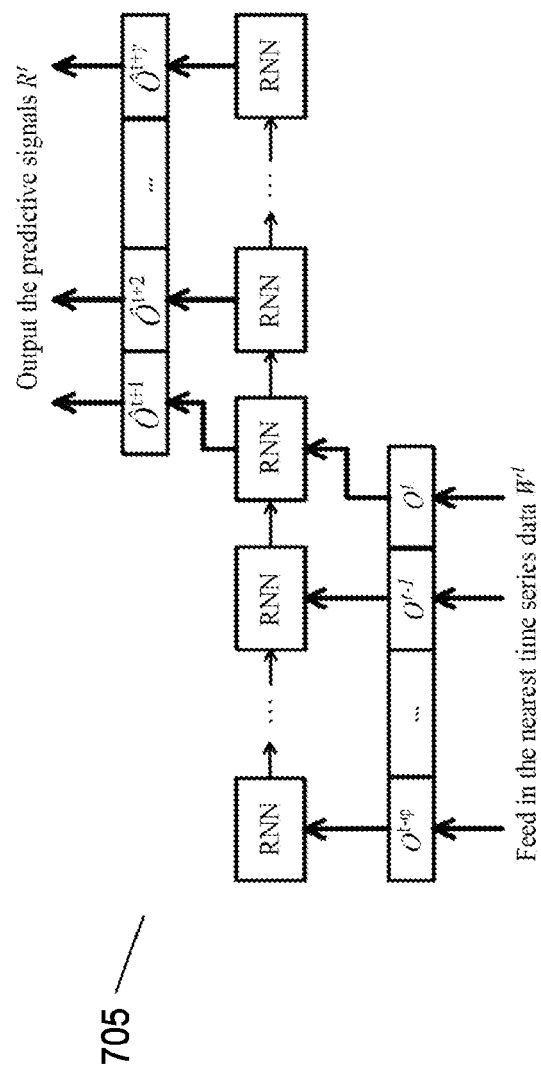
FIG. 8 shows an unfolded generation Recurrent Neural Network (RNN) according to an embodiment.

FIG. 8 shows an unfolded generation Recurrent Neural Network (RNN) according to an embodiment. As discussed above, the generation Recurrent Neural Network (RNN) 705 comprises a plurality of Recurrent Neural Network (RNN) cells. In FIG. 8 the generation Recurrent Neural Network (RNN) 705 is progressively fed the previously received command signals i.e. $O^{t-\varphi}, O^{t-\varphi+1}, \ldots, O^{t-1}, O^t$ and then progressively produces a vector of predicted signals comprising signals $\hat{O}^{t+1}, \hat{O}^{t+2}, \ldots, \hat{O}^{t+\gamma}$.

Figure 9:
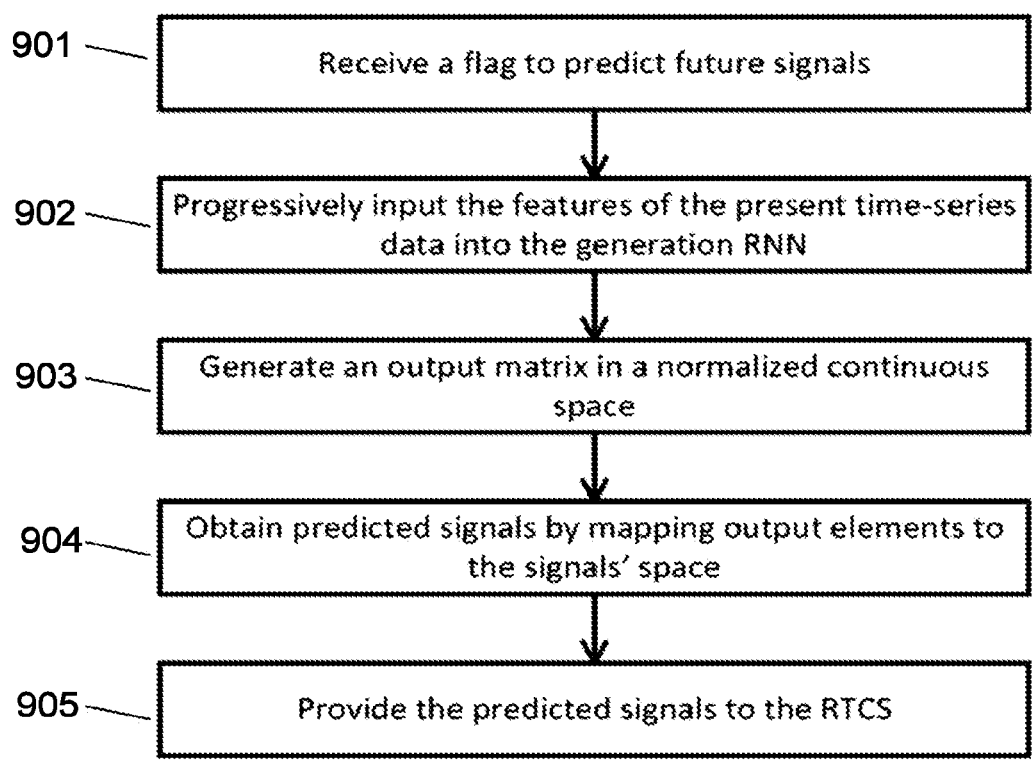
FIG. 9 shows a method of generating a predicted control signal using the generation Recurrent Neural Network (RNN) according to an embodiment.

FIG. 9 shows a method of generating a predicted control signal using the generation Recurrent Neural Network (RNN) according to an embodiment. In a first step 901 the long-term predictor 515 receives a flag to predict future signals. In an embodiment successful receipt of a command signal is a flag to predict future signals.

In step 902 the long-term predictor 515 progressively inputs the features of the present time-series data into the generation Recurrent Neural Network (RNN) 705. In step 902 the long-term predictor 515 inputs a nearest time series data $W^t$ into the generation Recurrent Neural Network (RNN) 705 in response to receiving a new command signal. The nearest time series data $W^t$ is a matrix of fixed length comprising previously received control signals (i.e. $W^t = [O^{t-\varphi}, O^{t-\varphi+1}, \ldots, O^{t-1}, O^t]$). Previously received control signals are progressively inputted into the generation Recurrent Neural Network (RNN) 705 starting with the oldest received control signal in the time series data i.e. in order $O^{t-\varphi}, O^{t-\varphi+1}, \ldots, O^{t-1}, O^t$ as shown in FIG. 8. Optionally, the long-term predictor 515 inputs the nearest time series data $W^t$ into generation Recurrent Neural Network (RNN) 705 immediately after successfully receiving a command from the master system.

Feeding the generation Recurrent Neural Network (RNN) 705 in this way progressively produces a vector of predicted signals $R^t = [\hat{O}^{t+1}, \hat{O}^{t+2}, \ldots, \hat{O}^{t+\gamma}]$, thereby generating an output matrix in a normalized continuous space as shown in step 903. In this example the prediction horizon (i.e. the length of time over which future predictions are made for) corresponds to the parameter γ.

In step 904 the long-term predictor 515 obtains predicted signals by mapping elements of the output matrix to the signal space, thereby translating a value of an output element to a corresponding control signal. In step 905 the long-term predictor 515 provides the predicted signal (i.e. the predicted control command) to the Real Time Control System (RTCS).

In an embodiment, the Recurrent Neural Network (RNN) of the long-term predictor 515 is trained offline, that is all of the training data is used at one time to build the model. Optionally, the training data is collected through practice use of the Real Time Control System (RTCS) or is generated by building a simulator. In this case a training/edge model 701 is deployed in the long-term predictor 515 for fine-tuning the previously generated model parameters on the fly. The evaluation Recurrent Neural Network (RNN) 702 has the same architecture as the generational Recurrent Neural Network 705.

Figure 10:
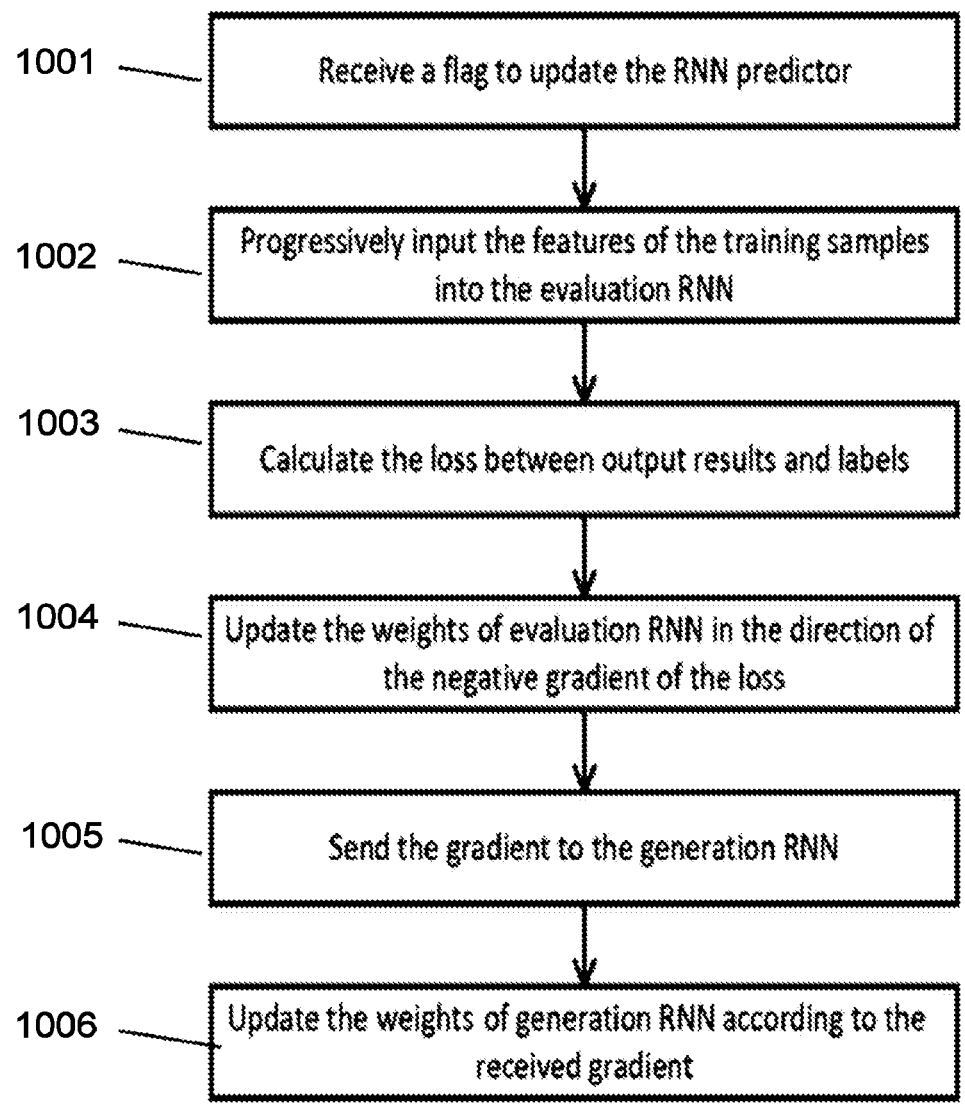
FIG. 10 shows a method of updating the model parameters of a Recurrent Neural Network (RNN) according to an embodiment.

FIG. 10 shows a method of updating the model parameters of a Recurrent Neural Network (RNN) according to an embodiment. In step 1001 the long-term predictor 515 receives or generates a flag (e.g. an instruction) to update model parameters of the generation Recurrent Neural Network (RNN) 705. The training frequency (i.e. how often the weights of the Recurrent Neural Network (RNN) are updated) is based at least partly on the use requirements. The training frequency may, for example, be set to a fixed value, for example during installation of the system, based on the circumstances surrounding the operation requirement of the RNN. The training frequency is not synchronized with the generation cycle, so that updated parameters are only provided at the end of the training period and not every time a training step is completed.

As well as storing a history of commands previously received from the master system, the buffer also comprises training data. The training data comprises sequences of command signals.

In response to receiving a flag to update the long-term predictor 515, the long-term predictor 515 randomly picks a batch of training samples, where each sample, (e.g. at time slot $\tau$) comprises an input matrix $W^\tau=[O^{\tau-\varphi}, O^{\tau-\varphi+1}, \ldots, O^{\tau-1}, O^\tau]$ comprising historical commands received for a period of time before and including time slot $\tau$, and a label matrix $L^\tau=[O^{\tau+1}, O^{\tau+2}, \ldots, O^{\tau+\gamma}]$ comprising actual commands received after time slot $\tau$.

In step 1002 the training input matrix, $W^\tau$, is progressively fed into the evaluation Recurrent Neural Network (RNN) 702, thereby generating a vector of predicted command signals e.g. $R^\tau=[\hat{O}^{\tau+1}, \hat{O}^{\tau+2}, \ldots, \hat{O}^{\tau+\gamma}]$. In step 1003 the training/evaluation model 701 calculates an average loss between the predicted command signals and the label matrix. This average loss is used in the gradient descent algorithm when modifying the evaluation model parameters. In an embodiment, the loss is obtained by calculating a Mean Squared Error (MSE) between the output results (i.e. the predicted command signals) and the corresponding actual command in the label matrix.

In step 1004 the training/evaluation model 1004 updates the weights of the evaluation Recurrent Neural network 702 in the direction of the negative gradient of the loss.

Both the training/evaluation model 701 and the predictive model 704 measure the prediction accuracy of their machine learning models (i.e. the evaluation Recurrent Neural Network (RNN) 702 and the generation Recurrent Neural Network (RNN) 705 respectively). In an embodiment the prediction accuracy is measured by calculating an average of the absolute errors between the predicted commands (e.g. the vector of predicted command signals) and the labels (e.g. the label matrix). In detail, we calculate the error (e.g., mean squared error (MSE)) between predicted results and corresponding labels over a fixed time period. This occurs in both the training model 701 and the predictive model 704. For this purpose only the errors of predictions generated for slots in which commands are received are calculated, with the received commands functioning as labels. Predictions relating to slots for which packets have been lost cannot be compared to a label. Such predictions are therefore excluded from the error calculation. The performance (e.g. prediction accuracy) of the training/evaluation model 701 is compared to the performance of the predictive model 704. Once the performance of the training/evaluation model 701 outperforms (i.e. has a better performance metric than) the predictive model 704, the parameters of the predictive model 704 are updated. In step 1005 the gradient obtained by the evaluation Recurrent Neural Network 702 is communicated to the predictive model 704 to generate updated weights/parameters 707 for use in making future predictions.

In step 1006 the weights of the generation Recurrent Neural Network 705 are updated based on the gradient received in step 1005.

In an alternative embodiment training of the training/evaluation model is conducted in an online manner without any pre-training. This is in contrast to the method of training discussed in relation to FIG. 10 where the machine learning model is generated offline and the training that takes places in the training/evaluation model 701 is for fine-tuning.

Figure 11:
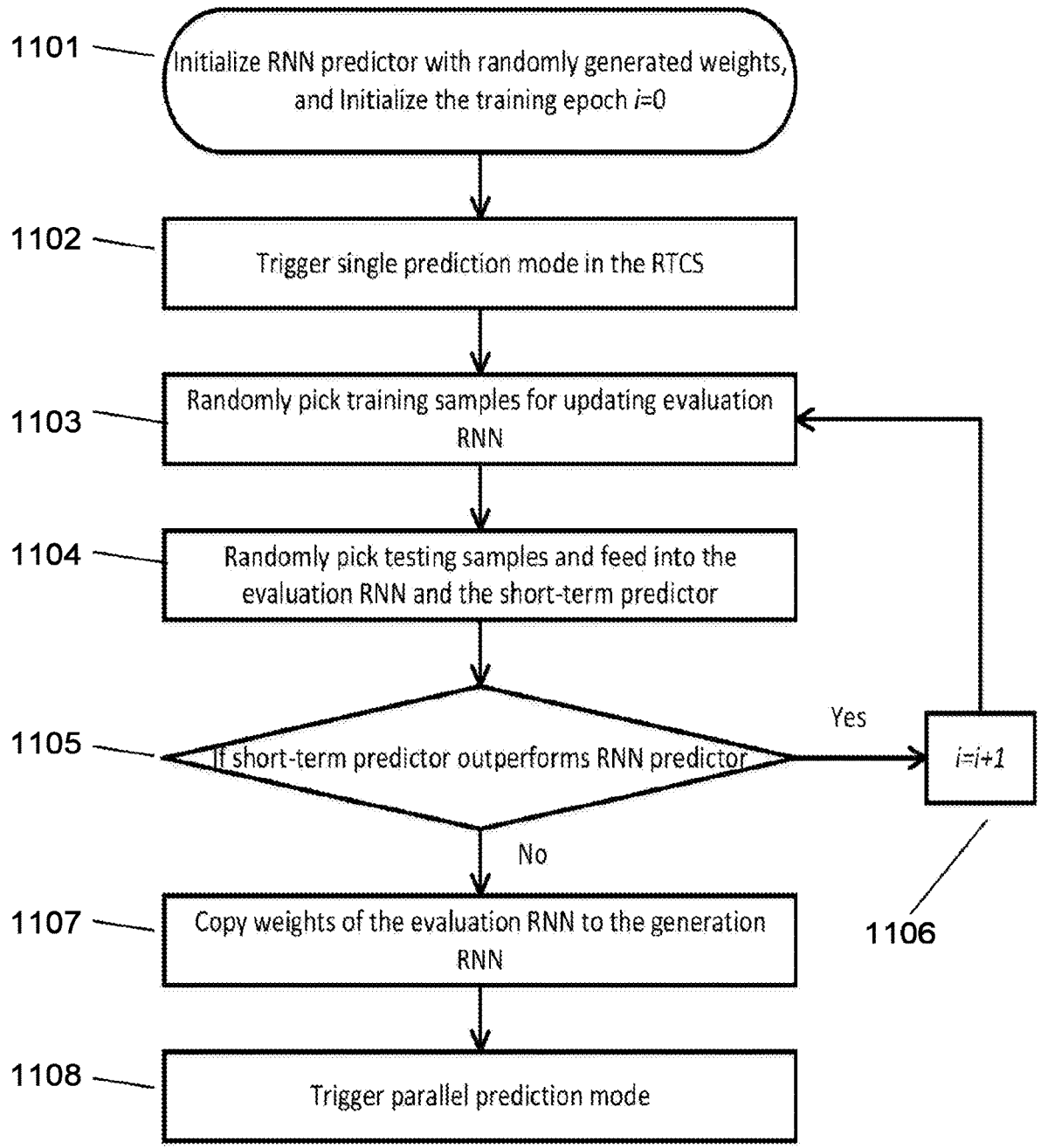
FIG. 11 shows a method of online training for a Recurrent Neural Network (RNN) according to an embodiment.

FIG. 11 shows a method of online training for a Recurrent Neural Network (RNN) according to an embodiment. In step 1101 the method begins by initializing the evaluation Recurrent Neural Network 702 in the training/evaluation model 701 with randomly generated weights. An epoch in this context refers to the time period required to train the model using the training data set (i.e. the time required to cycle through the full training set). The method begins at epoch i=0.

In step 1102 the predictor 511 triggers the short-term predictor 514, such that only the short-term predictor 514 generates predicted commands. As discussed above, as commands are received from the master system, they are stored in the buffer 513. In step 1103 the long-term predictor 515 randomly picks training samples for training the evaluation Recurrent Neural Network 702. In an embodiment this is achieved by selecting a plurality of received commands and separating the commands into an input matrix and a label matrix. In an embodiment training the evaluation Recurrent Neural Network (RNN) 702 is not synchronized with the generation cycle, as a result, training the evaluation Recurrent Neural Network 702 does not occupy CPU resources (e.g. at the Mobile Edge Computing server) when generating predictions.

In step 1104 the predictor 511 randomly picks testing samples from the buffer 513 and feeds these testing samples into both the evaluation Recurrent Neural Network (RNN) 702 and the short-term predictor 514 to measure the accuracy of the respective models.

In step 1105 the predictor 511 compares the prediction accuracy of the short-term predictor 514 with the prediction accuracy of the evaluation Recurrent Neural Network (RNN) 702. If the short-term predictor 514 outperforms the evaluation Recurrent Neural Network (RNN) 702 (i.e. the long-term predictor) then the method proceeds to step 1106, where the long-term predictor 701 waits until the next training epoch and trains the evaluation Recurrent Neural Network 702 again as described in step 1103. If, on the other hand, the evaluation Recurrent Neural Network (RNN) 702 outperforms the short-term predictor 514 (i.e. the evaluation Recurrent Neural Network 702 has a higher performance accuracy) then the method proceeds to step 1107.

In step 1107 the weights of the evaluation Recurrent Neural Network 702 are transferred (e.g. copied) to the generation Recurrent Neural Network 705. In step 1108 parallel prediction mode is triggered. That is, both the short-term predictor 514 and the long-term predictor 515 are used for generating predictions; the short-term predictor 514 for immediate prediction and the long-term predictor for longer time horizon predictions. In this state, the predictor 511 operates in a similar way to what was described in relation to FIG. 5.

In some instances the data size of the control signal (i.e. the control command) generated by the controller 502 in the master system is smaller than the maximum capacity of the communication packet used to transport data across the network to the slave system. In light of this, a commands-bundling transmission (CBT) technique is described below that efficiently uses the available communication bandwidth to transmit additional signals. These additional signals can be used for both direct control of the actuator 512 in the slave system, and for providing extra inputs (i.e. more features) for the predictor 511. This technique can be used when the packet used to communicate across the network is sized such that a plurality of successive command signals generated by the controller 502 can be transported in the same packet.

An example use-case of a Real Time Control System (RTCS) is in a motor control application. In this example, the sampling rate of the control signs (i.e. how often signals are generated to control the behavior of the motor) is greater than the transmission rate of the communication system (i.e. the rate at which information can be transferred across the communication network).

An embodiment, referred to as commands-bundling transmission (CBT) for higher sampling rates (CBT-HSR), is described which provides better prediction performance in the scenarios where the sampling interval (i.e. reciprocal of the sampling frequency) of the controller is smaller than the transmission interval (i.e. reciprocal of the transmission rate) of the network.

This technique can be used when the sampling rate of the controller, $f_{sr}$, is greater than the maximum transmission rate of the network, $f_{tr}$ (i.e. $f_{sr} > f_{tr}$). At each transmission interval (i.e. at each instant a communication packet is transmitted across the network), a number of control commands are packed into one communication packet and transmitted across the network to the slave side comprising the predictor 511 and the slave system. The number of commands that are packet into one packet is given by $\mu_{HSR} = [f_{sr}/f_{tr}]$. If only a single communication packet is received by the predictor 511 within a timing constraint (i.e. a period within which a control command is live/valid) then only one of the commands (e.g. the $\mu^{th}$ command) would be directly performed by the actuator 512 because the other (previous) commands contained in the packet are now outdated. As a result, the commands preceding the $\mu^{th}$ command (i.e. the outdated commands contained within the packet) will not be used for direct control, but will instead be used for generating future predictions.

Figure 12:
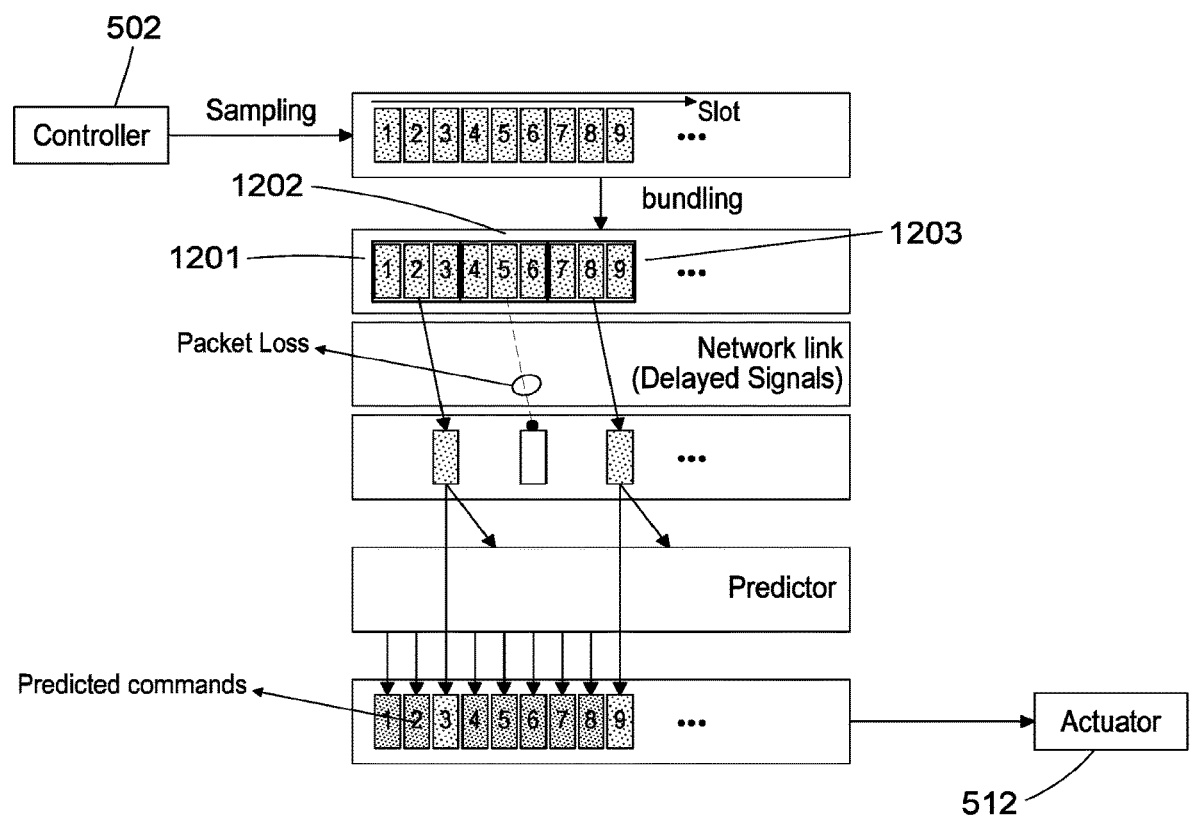
FIG. 12 shows an illustration of commands-bundling transmission (CBT) for higher sampling rates (CBT-HSR) according to an embodiment.

FIG. 12 shows an illustration of commands-bundling transmission (CBT) for higher sampling rates (CBT-HSR) according to an embodiment. In FIG. 12, the number of commands that are packet into one packet, $\mu_{HSR}$, equals three. Consequently, each packet for transmission across the network comprises three successive commands generated by the controller 502. In FIG. 12 the master system bundles nine commands generated by the controller 502 into a first communication packet 1201, a second communication packet 1202, and a third communication packet 1203. Specifically, the first communication packet 1201 comprises a first command, a second command and a third command, the second communication packet 1202 comprises a fourth command, a fifth command and a sixth command, and the third communication packet 1203 comprises a seventh command, an eight command and a ninth command.

During transmission across the network the second communication packet 1202 is lost. Consequently, in this example, only the first communication packet 1201 and the third communication packet 1203 are successfully received at the slave side comprising the predictor.

As discussed above, in the absence of a received command the predictor is configured to generate a predicted command. The predictor does not receive the first packet 1201 (comprising the first, second, and third commands) until at least the third command has been transmitted by the controller 502. Consequently there are no 'actual' commands received at the slave side in the first and second time slots (i.e. the timeslots in which the first and second commands are generated by the controller 502). Consequently, predicted commands generated by the predictor are transmitted to the actuator for these time slots. The $3^{rd}$ command is received in time (i.e. within the timeslot it was transmitted). Consequently, for the $3^{rd}$ time slot the slave side has both a predicted command and an 'actual' command available for further transmission to the actuator 512. As discussed above, the 'actual' command is always selected in preference to a predicted command. Consequently, the third command communicated in the first communication packet 1201 is transmitted to the actuator 512.

Since the second packet 1202 is lost in transmission, predicted commands generated by the predictor 511 will be transmitted in the fourth, fifth and sixth timeslots. Like the first packet 1201, the third packet 1203 is also successfully received. However, because of the bundling scheme used by the master system, only the ninth command (i.e. the command transmitted by the controller 502 in the ninth timeslot) is received in time. Consequently, the commands generated by the predictor 511 in the seventh and eighth timeslot are transmitted to the actuator 512.

In another example, the Real Time Control System (RTCS), e.g. the motor control application, has a sampling rate of control signals that is equal to or less than the transmission rate of the communication packets used to transport commands between the master system and the slave system. Or in other words, the rate at which commands are generated is equal to or less than the rate at which communication messages are generated. An embodiment, referred to as commands-bundling transmission (CBT) for lower sampling rates (CBT-LSR), is described which provides better prediction performance in situations where the sampling interval of the controller (i.e. the reciprocal of the sampling rate) is larger than the transmission interval (i.e. the slot time).

As with the commands-bundling transmission (CBT) for higher sampling rates (CBT-HSR), in commands-bundling transmission (CBT) for lower sampling rates (CBT-LSR) the communication packet has capacity to transport a plurality of command signals. In this example, the maximum number of command signals that can be communicated in a single communication packet is represented by the variable γ.

A transmitter (e.g. the master system) is configured to package a number of commands, $\mu_{LSR}$, into a single communication packet and transmit the communication packet to the slave side, which comprises the predictor, at each transmission interval of the communication network. In this case the number of commands, $\mu_{LSR}$, satisfies the requirement, $1 \leq \mu_{LSR} \leq \gamma$. Optionally, the number of commands, $\mu_{LSR}$, is predetermined. A relative large number of commands, $\mu_{LSR}$, is selected if the network link is unstable. In this case, the larger number of commands in the communication packet improves the likelihood that the predictor has as many 'actual' input features as possible in its memory. Thereby, improving the likelihood of an accurate prediction. If, on the other hand, the network link is considered stable, there is a higher likelihood that the communication packets will be successfully received, consequently a smaller number of commands, $\mu_{LSR}$, is bundled into each communication packet to save computational and communication resources.

Figure 13:
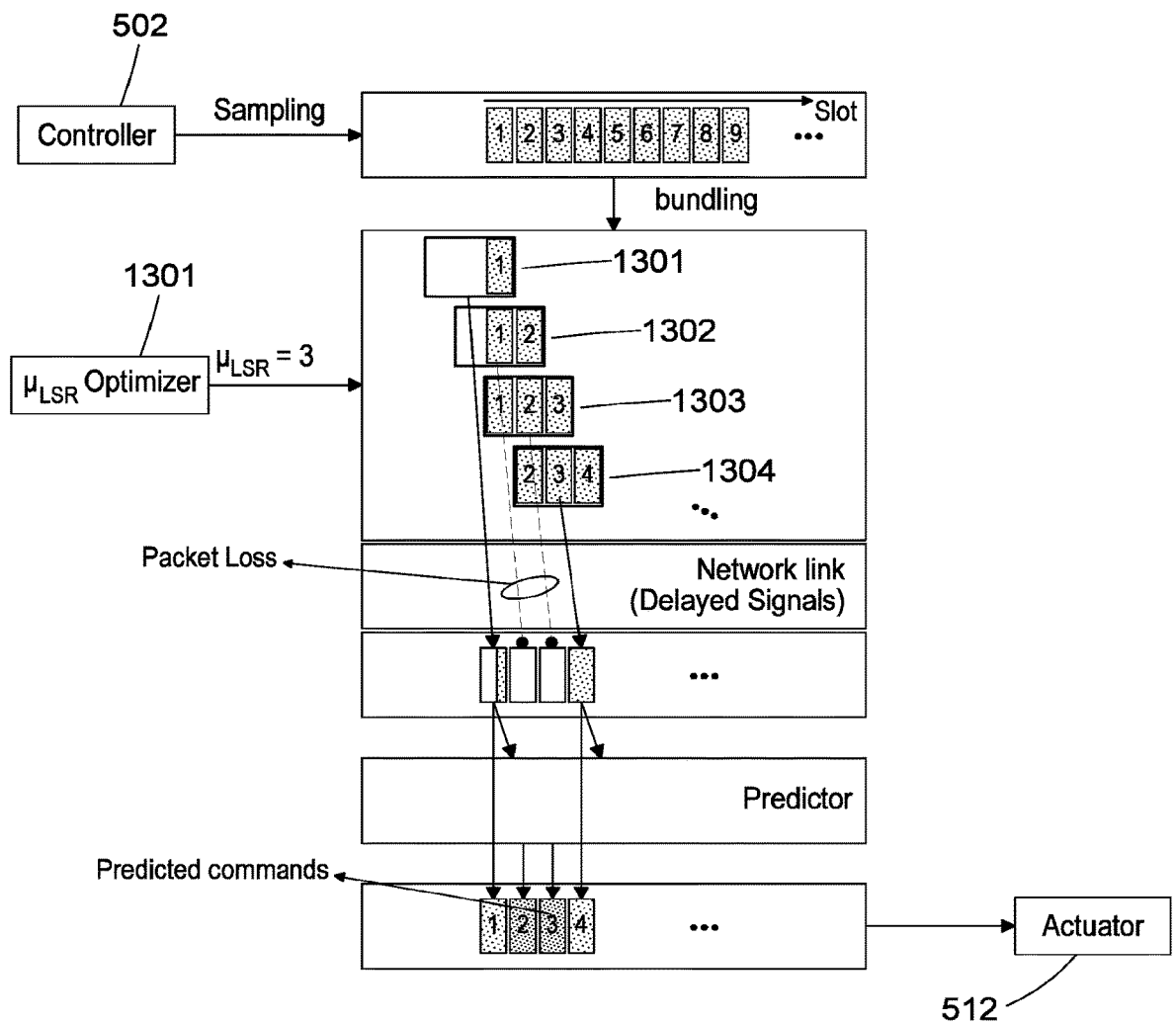
FIG. 13 shows an illustration of commands-bundling transmission (CBT) for lower sampling rates (CBT-LSR) according to an embodiment.

FIG. 13 shows an illustration of commands-bundling transmission (CBT) for lower sampling rates (CBT-LSR) according to an embodiment. In this embodiment, the master system comprises a bundling optimizer 1301 configured to store commands previously received from the controller 502 and pack these commands into a payload of a communication packet. In the example of FIG. 13 the number of commands, $\mu_{LSR}$, bundled into a communication packet equals three (i.e. $\mu_{LSR}$=3). As a result, the bundling optimizer 1301 is configured to package the current (i.e. latest) command transmitted by the controller 502 and the last two commands transmitted by the controller 502 into a communication packet.

In a first communication time slot the bundling optimizer 1301 generates a first communication packet 1301. Since there has only been one transmitted command in the first communication timeslot, the first communication packet contains only a first command generated by the controller 502. The first communication packet 1301 is subsequently transmitted by the master system to the slave side via a communication network.

In a second communication time slot a second communication packet 1302 is generated comprising the most-recently received command (i.e. a second command) and the last two commands. Since there is only one previous command available for packing (i.e. the first command transmitted by the controller 502), the second communication packet 1302 comprises the first and second control commands. The second communication packet 1302 is subsequently transmitted to the slave side of the Real Time Control System (RTCS).

In a third communication timeslot a third communication packet 1303 is generated comprising the command signals transmitted by the controller 502 in the first, second and third time slots. The third communication packet 1303 is subsequently transmitted to the slave side. In a fourth communication time slot a fourth communication packet 1304 is generated comprising the fourth command signal and the previous two command signals generated by the controller 502 (i.e. the second command and the third command), thereby bundling 3 commands in the fourth communication packet 1304.

In FIG. 13, only the first communication packet 1301 and the fourth communication packet 1304 are successfully received at the slave side (i.e. the side of the network comprising the slave system and the Mobile Edge Computing (MEC) server). In FIG. 13 both the second communication packet 1302 and the third communication packet 1303 are lost during transmission across the network. As a result, command signals generated by the predictor are transmitted to the actuator 512 for the second and third time slots.

As discussed above, the fourth communication packet 1304 comprises the second command signal transmitted by the controller 502, the third command signal transmitted by the controller 502, and the fourth command signal transmitted by the controller 502. By the time the fourth communication packet 1304 is received by the slave side, the second control signal and the third control signal are out of date, that is, there is a more recent control signal available for use. In this case the out-dated commands are used by the predictor to more-effectively predict future commands (e.g. in case of future packet loss for a fifth command).

Figure 14:
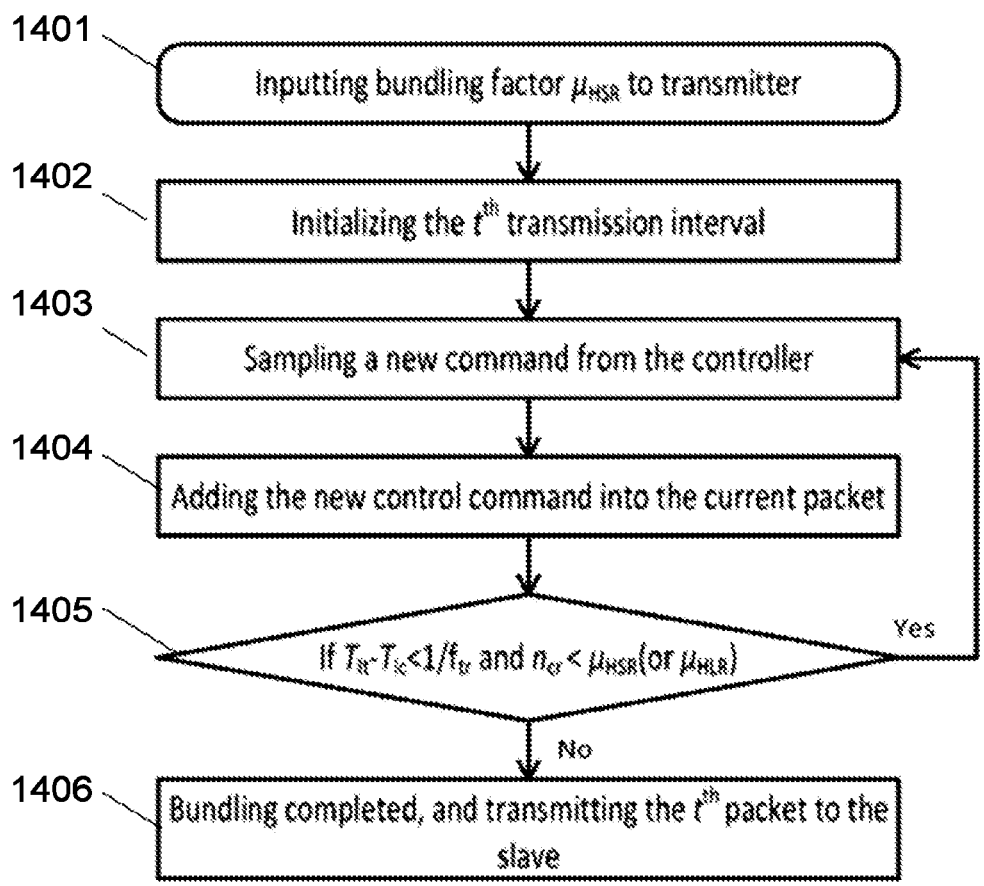
FIG. 14 shows a method of commands-bundling transmission (CBT) according to an embodiment.

FIG. 14 shows a method of commands-bundling transmission (CBT) according to an embodiment. In step 1401 the bundling factor is inputted to a transmitter at a master system. Optionally, the transmitter comprises the bundling optimizer 1301. The bundling factor may be predetermined.

FIG. 14 shows the bundling factor being the number of commands, $\mu_{HSR}$, bundled into a communication packet when commands-bundling transmission (CBT) is used for higher-sampling rates (i.e. CBT-HSR as described in FIG. 12). However, for the avoidance of doubt it is emphasized that the method of FIG. 14 is also applicable to commands-bundling transmission (CBT) for lower-sampling rates (CBT-LSR).

In step 1402 the method begins a transmission interval t, the transmission interval being the interval between commands being generated by a controller in a master system. In step 1403 the command, generated by the controller, is sampled (e.g. by a transmitter in the master system). In step 1404 the sampled command is added to a current communication packet.

The master system monitors the time of completing the last communication transmission interval, $T_{lt}$, the time of completing the command sampling, $T_{lc}$, and the number of commands in the current communication packet, $n_{cr}$.

In step 1405 the transmitter evaluates $T_{lt}-T_{lc}<1/f_{tr}$, where $f_{tr}$ is the transmission frequency of communication packets. In step 1405, the transmitter also evaluates $n_{cr}<\mu_{HSR}$ (or $\mu_{HLR}$). In essence, the transmitter compares whether a time since transmitting the last communication packet is less than the transmission period of communication packets, and whether the number of command signals bundled into the current communication packet is less than the inputted threshold.

If both of these conditions are satisfied, the method proceeds to step 1403 where a new command is sampled for inclusion into the current communication packet. If either of these conditions is not satisfied, then the current communication packet is ready for transmission. In this case the method proceeds to step 1406 where the current communication packet is transmitted to the slave side. Once received at the slave side, the commands contained within the communication packet are at least sequentially stored in a buffer for use in future predictions as discussed above.

Various known protocols can be used to communicate command signals in a Real Time Control System (RTCS). Known protocols include Transmission Control Protocol (TCP)/Internet Protocol (IP) and Stream Control Transmission Protocol (SCTP), which guarantee all bytes being identically received using a positive acknowledgement and re-transmission technique. In this case, after each command signal transmission, the master system waits for an Acknowledgement (ACK) or Non-Acknowledgment (NACK) signal from the slave system to confirm receipt of the transmitted signal.

In a further embodiment a technique referred to as commands-bundling transmission with adaptive replication (CBT-AR) is disclosed to reduce redundant transmissions over a communication network. This technique uses acknowledgements and re-transmissions present in the protocols discussed above.

In this embodiment the sampling rate of the control signals in the Real Time Control System (RTCS) is smaller than or equal to the transmission rate of the communication system (i.e. the rate at which communication packets are transmitted). Additionally, the data size of a control signal is less than the maximum capacity of a communication packet, as a result multiple successive commands can be filled (i.e. contained) within the same communication packet.

Figure 15:
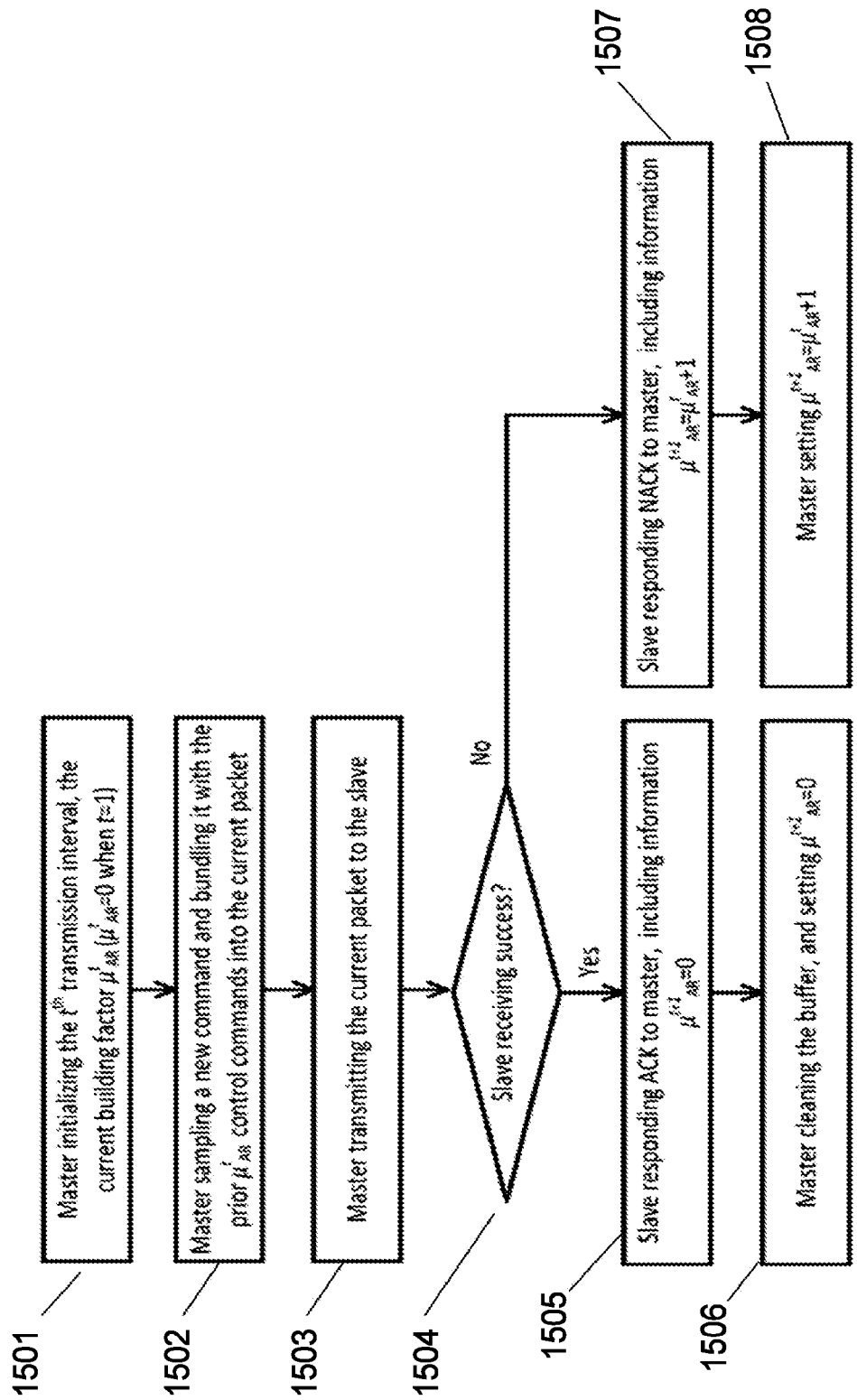
FIG. 15 shows a method of commands-bundling transmission with adaptive replication (CBT-AR) according to an embodiment.

FIG. 15 shows a method of commands-bundling transmission with adaptive replication (CBT-AR) according to an embodiment. In the method of FIG. 15 a buffer, of finite length, is located at the master side to store control commands generated by the controller.

In step 1501 the master side initializes the $t^{th}$ transmission interval, and the current bundling factor, $\mu^t_{AR}$. In the first communication transmission interval (i.e. t=1) the bundling factor for the first timeslot (i.e. timeslot t) equals 0 (i.e. $\mu^t_{AR}=0$). In step 1502 the master samples a new command from the controller and bundles it, along with a number of prior commands generated by the controller, into the current communication packet. The number of prior commands equals the bundling factor $\mu^t_{AR}$. Consequently, the first communication packet comprises only the first command generated by the controller, since the bundling factor equals 0 (i.e. $\mu^t_{AR}=0$). In step 1503 the master system transmits the current communication packet to the slave system.

In each timeslot the slave system transmits an Acknowledgement (ACK) or Non-Acknowledgment (NACK) signal to the master system depending on whether the communication packet was successfully received or unsuccessfully received respectively. In commands-bundling transmission with adaptive replication (CBT-AR) the ACK/NACK message comprises a commands-bundling transmission adaptive replication (CBT-AR) information signal indicating the control commands that have been lost in transmission.

In step 1504 the slave system determines whether a communication packet was received within a transmission timeslot. If the communication packet is successfully received by the slave system the slave system transmits an Acknowledgement (ACK) message to the master system. The Acknowledgment (ACK) message comprises a commands-bundling transmission adaptive replication (CBT-AR) information signal indicating that the bundling factor for the next communication transmission slot (i.e. $\mu^{t+1}_{AR}$) equals 0 (i.e. $\mu^{t+1}_{AR}=0$). This is because the command signal for the first transmission slot (i.e. slot t) was successfully received. Consequently, the slave system does not require the master system to retransmit the first command signal, it only requires the next command signal. Consequently, the bundling factor (i.e. the memory contained within the communication packet) is set equal to zero. In response to receiving the Acknowledgement (ACK) message transmitted by the slave system, the master system clears the buffer (i.e. removes command signals that were previously stored by the buffer) and sets the bundling factor in the t+1 timeslot to zero (i.e. $\mu^{t+1}_{AR}=0$) in step 1506.

If on the other hand, it is determined in step 1504 that the slave system has not received a communication packet successfully within the timeslot (e.g. because of packet loss or corruption) then the method proceeds to step 1507.

In step 1507 the slave system transmits a Negative-Acknowledgement (NACK) comprising a commands-bundling transmission adaptive replication (CBT-AR) information signal indicating that the bundling factor for the next communication transmission slot (i.e. $\mu^{t+1}_{AR}$) equals the bundling factor of the current transmission slot (i.e. $\mu^t_{AR}$) plus one (i.e. $\mu^{t+1}_{AR}=\mu^t_{AR}+1$) because the slave system is missing all of the commands bundled into the current communication packet (i.e. $\mu^t_{AR}$) and the current command signal. The master system subsequently receives the Negative-Acknowledgement (NACK) from the slave system and sets the bundling factor in the t+1 timeslot (i.e. $\mu^{t+1}_{AR}$) equal to the bundling factor of the current communication slot plus one (i.e. $\mu^{t+1}_{AR}=\mu^t_{AR}+1$). As a result, the master transmits a communication packet at the next time slot that comprises the newly generated $(t+1)^{th}$ command signal and all the existing control commands that are currently stored in the buffer.

Figure 16:
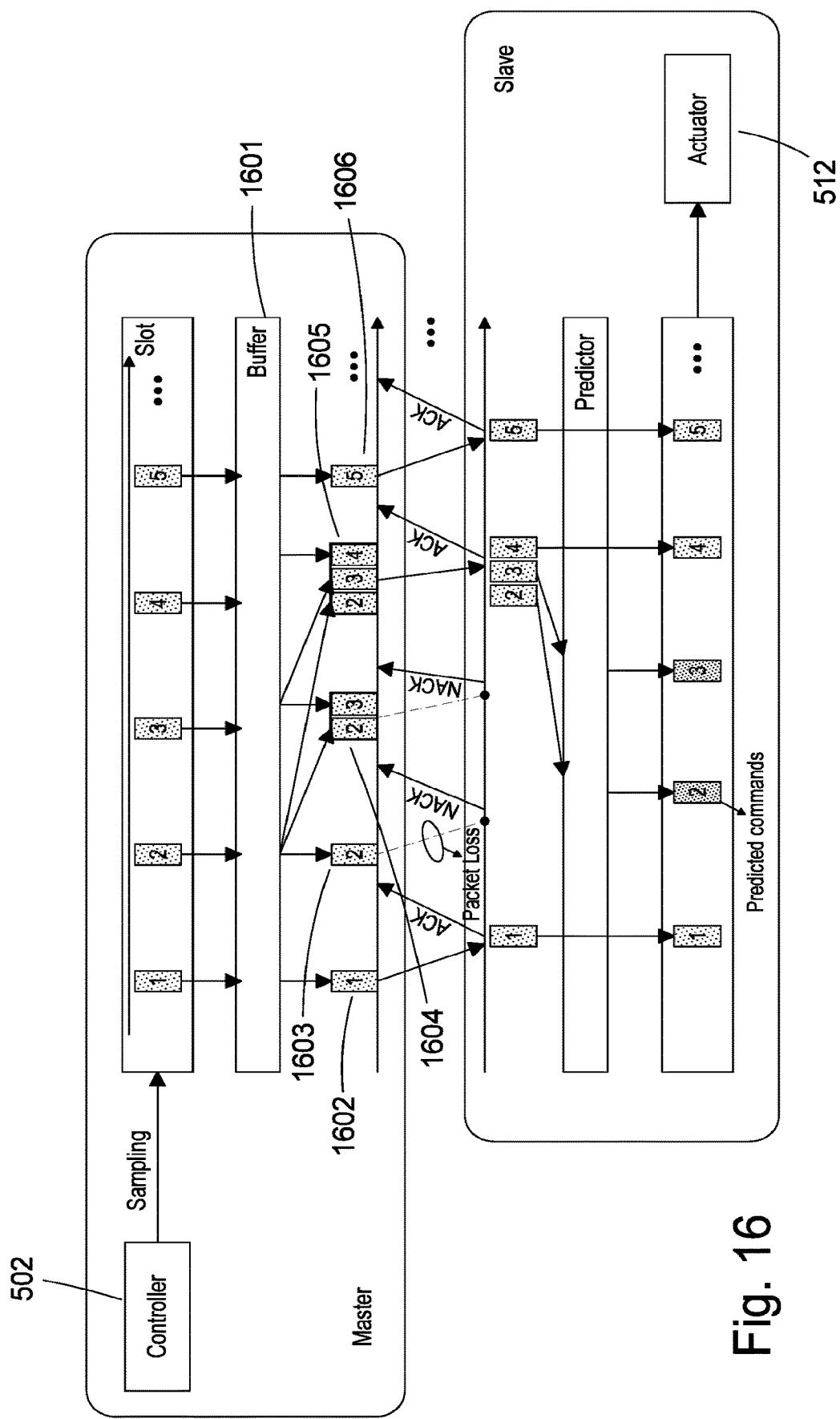
FIG. 16 shows a graphical representation of commands-bundling transmission with adaptive replication (CBT-AR) according to an embodiment.

FIG. 16 shows a graphical representation of commands-bundling transmission with adaptive replication (CBT-AR) according to an embodiment. FIG. 16 shows a controller 502 that generates command signals. Each command signal is at least initially stored in a buffer 1601. As discussed above, in a first communication time slot (i.e. t) the bundling factor is initialized to zero (i.e. $\mu^t_{AR}=0$). As a result, a first communication packet 1602 only contains a first command signal. The first communication packet 1602 is transmitted to the slave system where it is successfully received. In light of this the slave system transmits an acknowledgment (ACK) message comprising a commands-bundling transmission adaptive replication (CBT-AR) information signal indicating that the bundling factor for the next communication transmission slot (i.e. $\mu^{t+1}_{AR}$) equals 0 (i.e. $\mu^{t+1}_{AR}=0$) because the current command signal has been successfully received. The first control signal is subsequently communicated to the actuator 512.

The master system transmits a second communication packet 1603 in the next timeslot (i.e. t+1) comprising a second control signal. The second communication packet 1603 is lost during transmission. Consequently, a predicted command for the second command is transmitted to the actuator 512. Furthermore, the slave system transmits a negative-acknowledgement (NACK) message comprising a bundling factor for the next timeslot (i.e. $\mu^{t+2}_{AR}$) equal to the bundling factor of the current communication slot plus one (i.e. $\mu^{t+2}_{AR}=\mu^{t+1}_{AR}+1$). In this case the bundling factor equals 1.

The master system subsequently generates a third communication packet 1604. The bundling factor equals one. Consequently, the current command signal (i.e. a third command signal) and the 1 previous command signal (i.e. the second command signal) is retrieved from the buffer 1601 and included in the third communication packet 1604.

The third communication packet 1604 is subsequently transmitted. As shown in FIG. 16, the third communication packet 1604 is unsuccessfully received (e.g. due to packet loss or corruption). Consequently, a negative acknowledgment (NACK) is transmitted to the master system with a bundling factor equal to 2 (i.e. the previous bundling factor+1). Likewise, in the absence of an 'actual' command signal, a predicted command signal, generated by the predictor, is transmitted to the actuator 512.

The master system subsequently generates a fourth communication packet 1605 in a fourth transmission timeslot. The fourth communication packet comprises the current command signal (i.e. a fourth command signal) and the previous 2 command signals stored in the buffer. In this case the second command signal and the third command signal. The fourth communication packet 1605 is transmitted to the slave system where it is successfully received. The fourth control signal is subsequently transmitted to the actuator 512. The second and third control signals are out-of-date, however they can be used by the predictor for generating future predictions.

In response to receiving the fourth communication packet 1605 the slave system transmits an acknowledgment (ACK) message. Since all control signals have been received, the acknowledgment comprises a bundling factor for the next timeslot equal to 0 (i.e. no historical command signals are required by the slave system). In response to receiving the acknowledgment (ACK) message the slave system clears the buffer 1601, and in the fifth timeslot transmits a fifth communication packet 1606 comprising a fifth command signal only.

In some use cases augmented feedback signals are expected to be received at the master side after each control command has been transmitted in order to close the control loop. An example of this is a teleoperation system being augmented by feedback from the computer system instead relying on human observation. In an embodiment, remote haptic feedback augmentation is provided by transmitting mechanical force signals and temperature signals in a teleoperation system to help the user better recognise the environment in which the slave system is operating.

In an embodiment a bi-directional teleoperation system is provided where a user (e.g. human operator) delivers command signals (e.g. position and force) to a slave system for interaction with the environment in real-time. Furthermore, the slave system closes the global control loop by providing the master system (and the user) with augmented multi-modal feedback (e.g., visual, auditory, and haptic feedback). Although this example is in the context of a teleoperation system, it will be understood that the techniques described herein are applicable to any bi-directional Real Time Control System (RTCS).

The quality of the communication network that is used to communicate both control and feedback transmissions can be limited due to the distance of the communication link, the bandwidth of the communication link and the traffic burden (e.g. from other users) of the communication link. A limited quality of the communication link can result in uncertain packet loss and uncertain latency. Consequently, there is a need for bi-directional prediction in Real Time Control Systems (RTCS).

Figure 17:
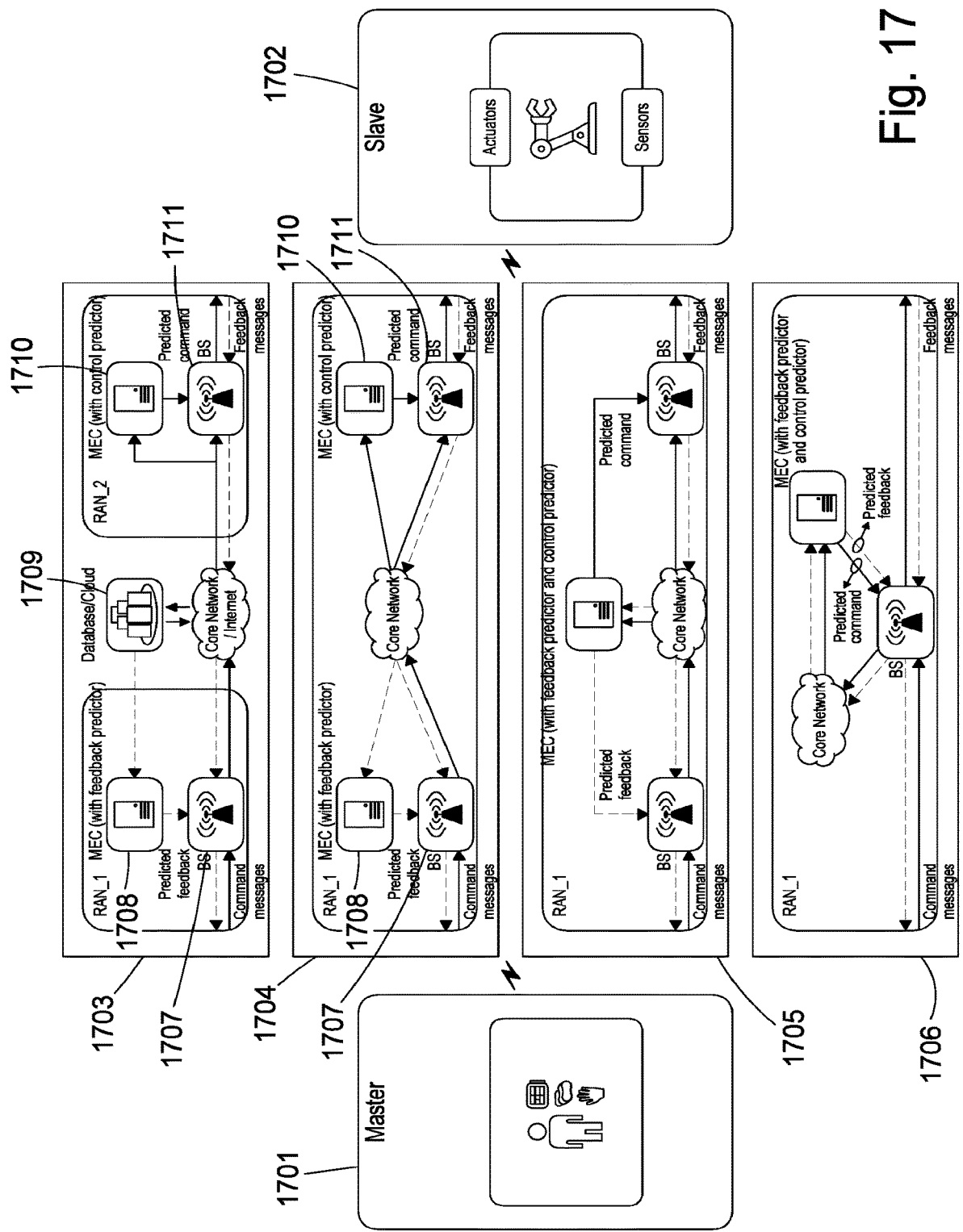
FIG. 17 shows alternative structures for a bi-directional Real-Time Control System (RTCS) according to an embodiment.

FIG. 17 shows alternative structures for a bi-directional Real-Time Control System (RTCS) according to an embodiment. FIG. 17 shows a Real Time Control System (RTCS) comprising a master system 1701 configured to generate control signals and receive feedback signals, and a slave system 1702 configured to receive control signals and generate feedback signals. The slave system 1702 comprises an actuator for effecting the control signals, and a sensor for generating the feedback signals. The master system 1701 and the slave system 1702 are connected to each other by a wireless network link. There are various implementations of the network shown in FIG. 17.

In a first implementation 1703 a master side comprises a first Radio Access Network (RAN) comprising the master system 1701, a first base station 1707 and a first Mobile Edge Computing (MEC) server 1708. The first base station 1707 is communicatively coupled to the master system 1701 by a wireless connection and is communicatively coupled to the first Mobile Edge Computing (MEC) server 1708 by a wired connection. Both the first Mobile Edge Computing (MEC) server 1708 and the first base station 1707 are communicatively coupled to a core network/internet. The first Mobile Edge Computing (MEC) server 1708 comprises a predictor for predicting feedback signals generated by the slave system 1702.

In the first implementation 1703, a slave side comprises a second Radio Access Network (RAN) comprising the slave system 1702, a second base station 1711 and a second Mobile Edge Computing (MEC) server 1710. The slave system 1702 is communicatively coupled to the second base station by a wireless communication link. The second base station is communicatively coupled by a wired communication link to the second Mobile Edge Computing (MEC) server 1710. Both the second Mobile Edge Computing (MEC) server 1710 and the second base station 1711 are communicatively coupled to the core network/internet. The second Mobile Edge Computing (MEC) server 1710 comprises a predictor for predicting commands generated by the master system 1701. Optionally, the first implementation also comprises a Database 1709 to train each of the predictive models contained within the first and second Mobile Edge Computing (MEC) servers 1709, 1710. In the first implementation, the master and slave sides have independent Radio Access Networks (RANs) with independent prediction means contained within their respective Mobile Edge Computing (MEC) servers.

A second implementation 1704 has a similar arrangement to the first implementation 1703 however in contrast to the first implementation 1703, in the second implementation 1704 the master system 1701 and the slave system 1702 are deployed in the same Radio Access Network (RAN) but are served by different base stations and different Mobile Edge Computing (MEC) servers.

A third implementation 1705 has a similar arrangement to the second implementation 1704 however in contrast to the second implementation 1704, in the third implementation 1705, the master system 1701 and the slave system 1702 both share the same Mobile Edge Computing (MEC) server. That is to say, the Mobile Edge Computing Server (MEC) in the third implementation 1705 comprises a predictor for predicting control signals generated by the master system 1701 and a predictor for predicting feedback signals generated by the slave system 1702. In the third implementation the master system 1701 and the slave system 1702 are served by different base stations.

A fourth implementation 1706 has a similar arrangement to the third implementation 1705. However, in contrast to the third implementation 1705, the fourth implementation 1706 uses a single base station for communication between the master system 1701 and the slave system 1702.

Irrespective of the implementation chosen, the general processing flow when executing a bi-directional Real Time Control System (RTCS) with predictive models is as follows.

At first, the master system 1701 transmits a control command to the slave system 1702 over a wireless communication link. The command transmitted by the master system 1701 over the wireless link is received by a base station (e.g. the first base station 1707). The first base station forwards the command signal to the core network over a wired interface. The command signal is subsequently forwarded over the core network/internet to the slave side.

In response to receiving the control command signal the core network, for example servers within the core network, duplicates the control signal. A first copy of the control signal is transmitted to the Mobile Edge Computing (MEC) server comprising the predictor for predicting command signals. In the first implementation 1703 and the second implementation 1704, this Mobile Edge Computing (MEC) server is the second Mobile Edge Computing (MEC) server 1711. The first copy received by the Mobile Edge Computing (MEC) server is used for the generation and training process in the predictive model.

A second copy of the control signal is transmitted to the base station in communication with the slave system 1702. This base station is the second base station 1711 in the case of the first implementation 1703, the second implementation 1704 and the third implementation 1705. In the case of the fourth implementation the same base station serves both the master and the slave side.

The base station serving the slave side (i.e. the second base station 1711 in the first 1703, second 1704, and third 1705 implementations) performs proactive resource allocation for both the 'actual' command signal, as well as the predicted command signal generated by the predictor serving the slave side. That is to say, there are resources allocated by the base station to communicate both the actual command signal and the predicted command signal to the slave system 1702. As discussed above, at each timeslot the predictor generates a predicted command.

If there is no communication loss or corruption across the network the base station serving the slave side will receive both an 'actual' control signal transmitted by the master system 1701 and a 'predicted' control signal generated by the predictor in the Mobile Edge Computing (MEC) server serving the slave side.

If both the 'actual' control signal and the 'predicted' control signal are received by the base station then the base station will transmit the 'actual' control signal to the slave system 1702. If the 'actual' control signal is delayed or lost during transmission then the 'predicted' control signal is transmitted to the slave system 1702 by the base station.

As discussed above, FIG. 17 is a bi-directional Real Time Control System (RTCS). As a result, in addition to a control signal being communicated from the master system 1701 to the slave system 1702, there is also a feedback signal communicated from the slave system 1702 to the master system 1701. In FIG. 17 the processing flow of the control signal is repeated for the feedback signal.

In brief, the slave system 1702 transmits a feedback signal via a wireless network to the base station serving the slave side (e.g the second base station 1711 in the first 1703, second 1704, and third 1705 implementations). The base station forwards the feedback signal to the core network. The core network duplicates the feedback signal and forwards a first copy of the feedback signal to the Mobile Edge Computing (MEC) server serving the master side. This feedback signal is subsequently used by the predictor in the Mobile Edge Computing (MEC) server to train the model and generate predictions. The core network also forwards a second copy of the feedback signal to the base station serving the master side. At each time slot the predictor in the Mobile Edge Computing (MEC) server serving the master side generates a 'predicted' feedback command. Similar to the base station serving the slave side, the base station serving the master side transmits the 'actual' feedback signal where it is available. If, on the other hand, the 'actual' feedback signal is delayed or lost during transmission the base station serving the master side will transmit the 'predicted' feedback signal to the master system 1701.

In some embodiments the data format and the size of the control and feedback signals can be different. In the teleoperation example discussed above, the control signal may be torque signals (communicated using smaller packets) and the feedback signals may be video signals (communicated more often using larger packets). In the embodiments of FIG. 17 the control system (i.e. the issuance of control commands by a master system, prediction of control commands, and transmission to slave system) is independent of the feedback system (i.e. the issuance of feedback signals by a slave system, prediction of feedback signals, and transmission to the master system). In this case, the control system and the feedback system are two independent unidirectional parts, where each system (i.e. the control system or the feedback system) comprises a Temporal-Adaptive Prediction (TAP) model with independent parameters. This setup is also referred to as an Individual Predictive Model (IPM).

In this case, a predictive model is employed on the slave side to predict the control signals (e.g. planned positions, speeds, accelerates, torques, etc.) that are generated by the master system. Conversely, on the master side, a predictive model is employed in the Mobile Edge Computing (MEC) server, for predicting feedback signals that are generated by the slave system. In an embodiment, the commands-bundling transmission (CBT) techniques discussed above are employed by either or both systems (i.e. the control system or the feedback system) independently.

In a different embodiment the data format and the size of the control and feedback signals are similar (i.e. the signals are closely related). In the teleoperation example discussed above the control signals may be torque signals and the feedback signals may be haptic feedback signals. In this case, the control signals and the feedback signals are of an equivalent size and are transmitted at a similar rate.

In an embodiment, a technique described herein as Universal Predictive Model (UPM) exploits the highly correlated nature between the control signals and feedback signals in order to improve prediction accuracy. In particular, a Universal Predictive Model (UPM) predicts both the control signal and the feedback signal using a single predictive model. Since the control signal and the feedback signal are highly correlated the provision of both control signals and feedback signals as inputs to the Universal Predictive Model (UPM) provides more useful features, thereby improving prediction accuracy. This is different to Individual Predictive Model (IPM) where a model only has an input for, and predicts one type of signal (e.g. feedback signals or control signals).

In Universal Predictive Model (UPM), when a system (e.g. the master system 1701 or the slave system 1702) transmits a signal (e.g. a command signal or a feedback signal), the receiving base station forwards the signal to both the core network and the near Mobile Edge Computing (MEC) server (i.e. the MEC server located on that same side of the network). For example, in the first implementation 1703, upon receiving a command signal from the master system 1701, the first base station 1707 transmits the command signal to the core network, and to the first Mobile Edge Computing (MEC) server 1708. In this case the first Mobile Edge Computing (MEC) server 1708 is on the same side of the network as the master system 1701 (i.e. it is on the master side).

In Universal Predictive Model (UPM) each Mobile Edge Computing (MEC) server comprises a further buffer for storing signals generated by the local system. For example, in the first implementation 1703, the first Mobile Edge Computing (MEC) server comprises a further buffer for storing command signals generated by the master system 1701.

In an embodiment, each Mobile Edge Computing (MEC) server implements a Temporal-Adaptive Prediction (TAP) model. As discussed above, in this model there is a short-term predictor to generate predictions with low execution delay and a long-term predictor to generate predictions over a longer time horizon. In this embodiment the short-term predictor is implemented using an Individual Predictive Model (IPM) (i.e. using only one of control signals or feedback signals), while the long term predictor is implemented using a Universal Predictive Model (UPM) that makes predictions based on both signal directions (i.e. control signals and feedback signals).

Figure 18:
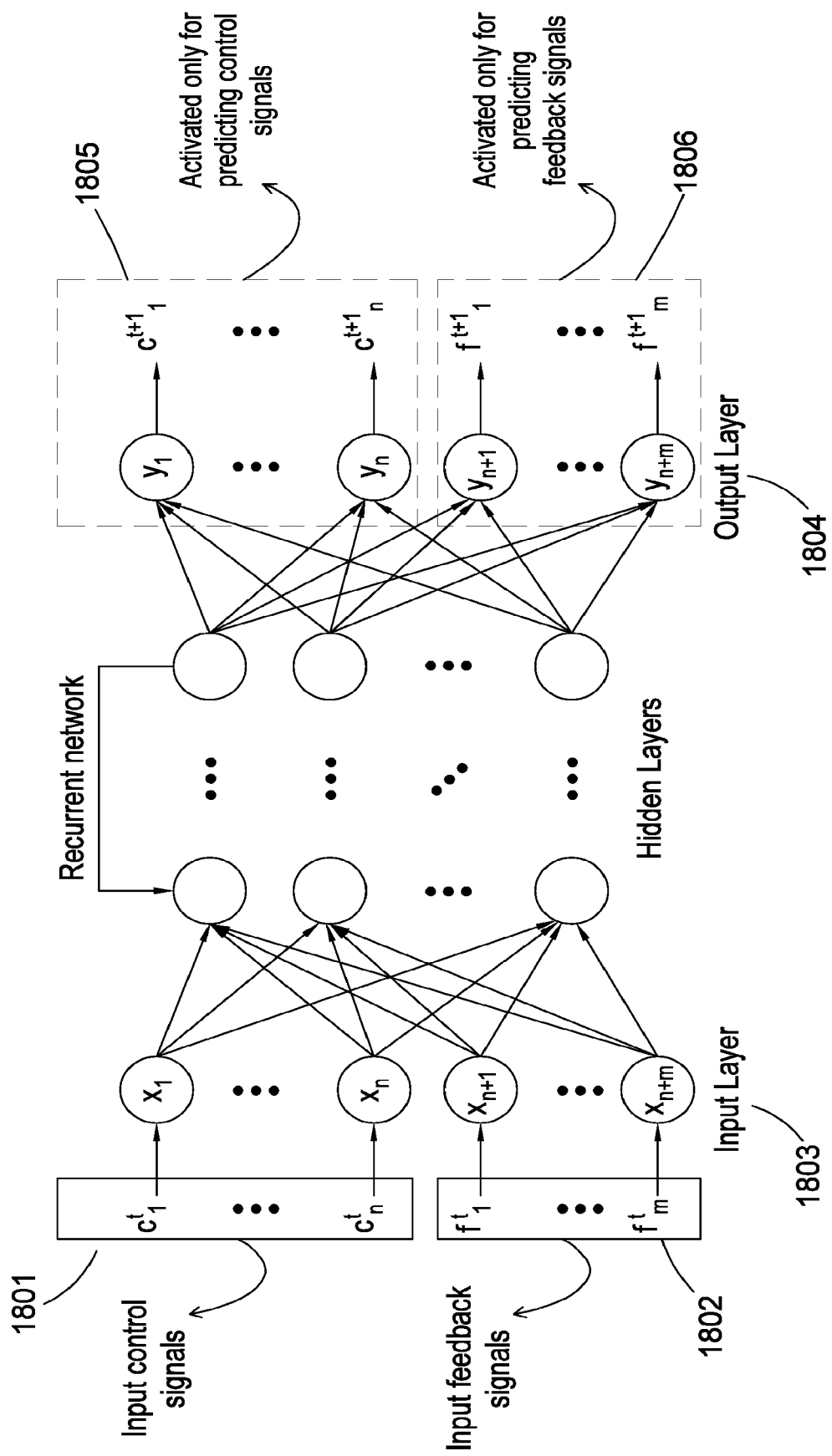
FIG. 18 shows an example of a Universal Predictive Model (UPM) in a long term-predictor according to an embodiment.

FIG. 18 shows an example of a Universal Predictive Model (UPM) in a long term-predictor according to an embodiment. In FIG. 18 the Universal Predictive Model (UPM) is implemented using the basic Recurrent Neural Network (RNN) architecture known in the art and is trained using Supervised Learning (SL). At a given timeslot, t, the input control signal 1801, with n Degrees of Freedom (DoF), is given by $c^t_n$. While the input feedback signal 1802, at timeslot t, having m Degrees of Freedom (DoF), is given by $f^t_m$. An input layer 1803 of the Recurrent Neural Network (RNN) is given by the variables of the input control signal 1801 and the input feedback signal 1802. The intermediate layers of the Recurrent Neural Network (RNN) are implemented using sets of Recurrent Neural Network (RNN) units (e.g. long short-term memory (LSTM) or gated recurrent units (GRU) architectures), and the output layer 1804 comprises activation functions to generate both a predicted control signal 1805 and a predicted feedback signal 1806 at timeslot t+1.

The Universal Predictive Model (UPM) is used both the long-term predictor at the slave side and the (different) long-term predictor at the master side. Considering the slave side first. The slave side receives control signals from the master system across the network, and generates feedback signals locally. The input to the Recurrent Neural Network (RNN) comprises historical feedback signals generated by slave and historical control signals generated by the master system and transmitted across the network. The Mobile Edge Computing (MEC) server stores a copy of the locally generated feedback signals in a buffer (optionally the further buffer discussed above). These feedback signals are "perfect" in the sense that they have experienced little or no corruption/packet loss. The Mobile Edge Computing (MEC) server also stores a copy of the received control commands transmitted by the master system in a buffer. These historical commands are imperfect, in the sense that some of these signals may be corrupted or lost during transmission. Consequently, the historical record may be incomplete.

At the slave side the machine learning model is activated so as to predict a future control signal based on previously received control signals and previously generated feedback signals. As discussed above, this predicted control signal is transmitted by the base station to the slave system in the absence of an 'actual' control command being received. In the slave side the parts of the output layer that generate the predicted feedback signal 1806 are de-activated. Consequently, in the slave side the Universal Predictive Model (UPM) uses previous control signals and previous feedback signals to generate a predicted control signal.

A complimentary configuration is used at the master-side Mobile Edge Computing (MEC) server. At the master side the locally generated and stored command signals are used as input along with the feedback signals received from the slave system. In this case the control signals are locally generated and stored in the further buffer. The historical record of control signals is considered to be "perfect" given the low packet loss/corruption. At the master side the record of the feedback signals stored in the buffer is considered "imperfect" due to communications delay and corruption that is experienced when communicating the feedback signal over the network. At the master side, the Mobile Edge Computing (MEC) server feedsforward variables to the long-term predictive model. These variables include the historical control signals generated by the master system and the historical control signal signals received from the slave system, which suffer from packet loss. In the master side the parts of the output layer that generate the predicted control signal 1805 are de-activated. Consequently, in the master side the Universal Predictive Model (UPM) uses previous control signals and previous feedback signals to generate a predicted feedback signal.

Training of the Universal Predictive Model (UPM) depends on the implementation used for the Real Time Control System (RTCS) as described in FIG. 17. In the first implementation 1701 the Universal Predictive Model (UPM) is trained at the Database/Cloud 1709 and model parameters are transmitted to the first Mobile Edge Computing (MEC) Server 1708 and the second Mobile Edge Computing (MEC) server 1710. In the second implementation 1704 training is executed at each of the respective Mobile Edge Computing (MEC) servers and the results are shared between the two Mobile Edge Computing (MEC) servers. In an embodiment an average of the results generated at the Mobile Edge Computing (MEC) servers is calculated to share the results. In the third implementation 1705 and the fourth implementation 1706 the model training is conducted by the single Mobile Edge Computing (MEC) server that is shared between the master side and the slave side.

As discussed above, embodiments that implement bi-directional prediction can be implemented using commands-bundling transmission, CBT, (i.e. combining a plurality of control/feedback signals in a communication packet to provide a better historical record for the purpose of prediction). One variant of commands-bundling transmission is commands-bundling transmission with adaptive replication (CBT-AR). In commands-bundling transmission with adaptive replication (CBT-AR) a bundling factor, $\mu$, is provided in the acknowledgment/non-acknowledgement (ACK/NACK) message to indicate the number of historical commands (i.e. the memory) that should be included in the next transmitted message. The receiver uses the bundling factor, $\mu$, to improve its record of previously transmitted commands, thereby enabling more accurate future prediction.

In some cases the Real Time Control System (RTCS) may communicate across a network that does not use handshaking dialogues (e.g. when User Datagram Protocol (UDP) is used). This avoids having the overheads in the protocol stack associated with handling and generating confirmations and retransmissions. However, in this case there is no acknowledgment/non-acknowledgement (ACK/NACK) message within which the commands-bundling transmission with adaptive replication (CBT-AR) information (i.e. the bundling factor, $\mu$) can be transported.

In an embodiment an Embedded Feedback Mechanism (EFM) is implemented in a bi-directional Real Time Control System (RTCS) to transport commands-bundling transmission with adaptive replication (CBT-AR) information. In this case the commands-bundling transmission with adaptive replication (CBT-AR) information is generated in response to a successful/failed receipt of a communication packet (e.g. from the master containing control signals). This information is then integrated in communication packets transmitted in the opposite direction (e.g. along with feedback signals transmitted by slave system to the master system) in the next time slot.

Figure 19:
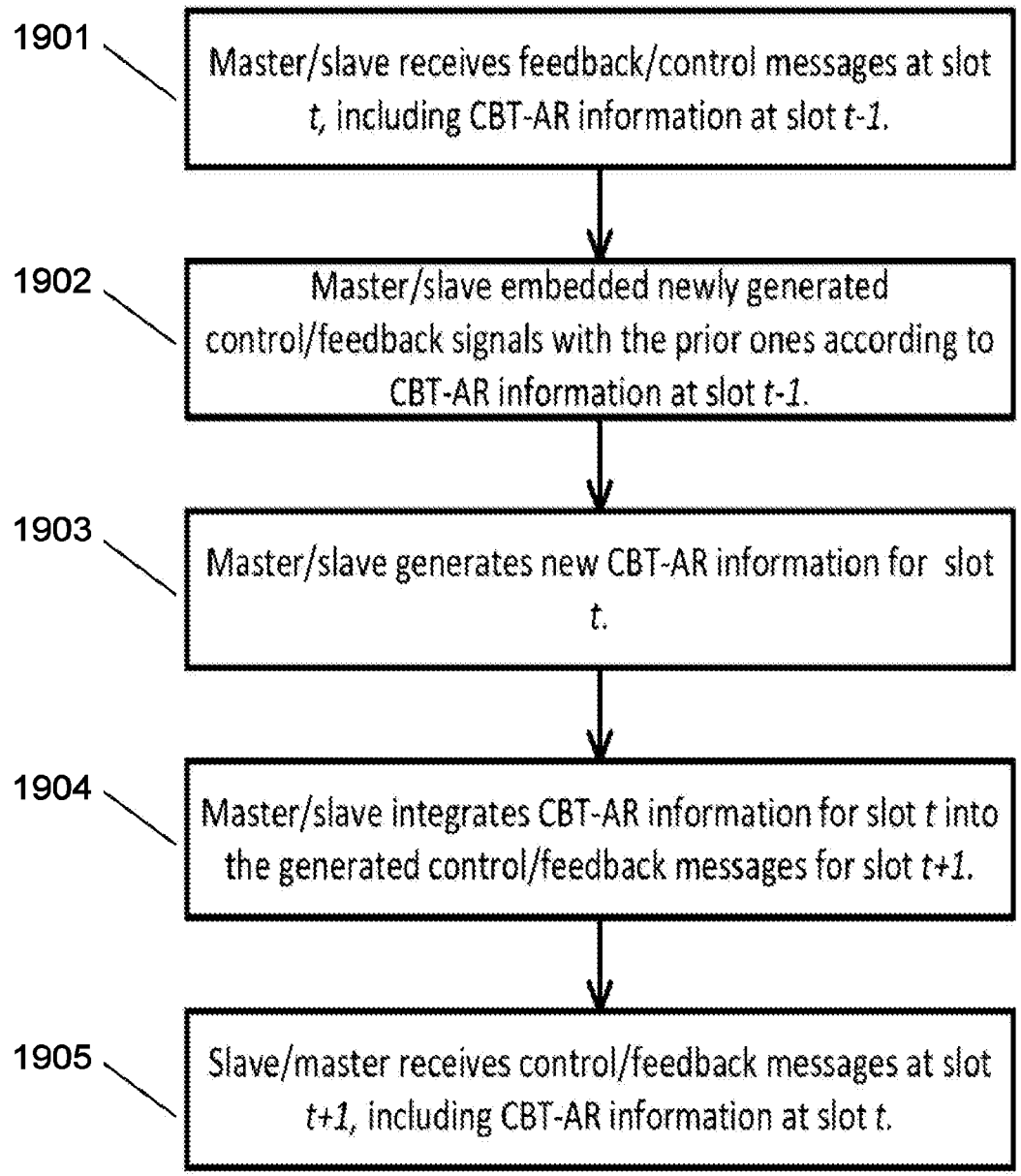
FIG. 19 shows commands-bundling transmission with adaptive replication (CBT-AR) using Embedded Feedback Mechanism (EFM) according to an embodiment.

FIG. 19 shows commands-bundling transmission with adaptive replication (CBT-AR) using Embedded Feedback Mechanism (EFM) according to an embodiment. FIG. 19 will be described in relation to the master system receiving the message in step 1901 for the sake of clarity. However, for the avoidance of doubt it is noted that the slave system may implement the corresponding process.

In step 1901 the master system receives a feedback message at timeslot t. The message received in step 1901 comprises commands-bundling transmission with adaptive replication (CBT-AR) information generated by the slave system at the previous timeslot, i.e. timeslot t−1. The message received in step 1901 also comprises feedback signals from the slave system. In an embodiment the commands-bundling transmission with adaptive replication (CBT-AR) information is a bundling factor, μ.

In step 1902 the master system forms a communication packet comprising a newly generated control signal and a number of previously transmitted control signals. The number of previously transmitted control signals depends on the commands-bundling transmission with adaptive replication (CBT-AR) information received in step 1901. For example, if the commands-bundling transmission with adaptive replication (CBT-AR) information received in step 1901 indicates that there was no control signal received by the slave system for timeslot t−1, then the number of previous commands equals 1 and the communication packet formed in step 1902 comprises the command signal generated by the master system in timeslot t−1.

In step 1903 the slave system generates new commands-bundling transmission with adaptive replication (CBT-AR) information for timeslot t. For example, indicating whether the slave system has received a control command for timeslot t, and in the case of the example above, whether it has received the missing control command from timeslot t−1.

In step 1904 the slave system integrates the commands-bundling transmission with adaptive replication (CBT-AR) information for timeslot t into the communication packet comprising the feedback signal for timeslot t+1. In step 1905 the master system receives the communication packet comprising the feedback signal for timeslot t+1 and the commands-bundling transmission with adaptive replication (CBT-AR) information for timeslot t. The master system uses the commands-bundling transmission with adaptive replication (CBT-AR) information for timeslot t to determine the number of previous control signals to embed in a communication packet comprising a newly generated control signal.

The above-described methods were simulated in a Real Time Control System (RTCS) used to control a robotic manipulator aiming at picking and putting a can of drink into a rubbish bin.

Figure 20:
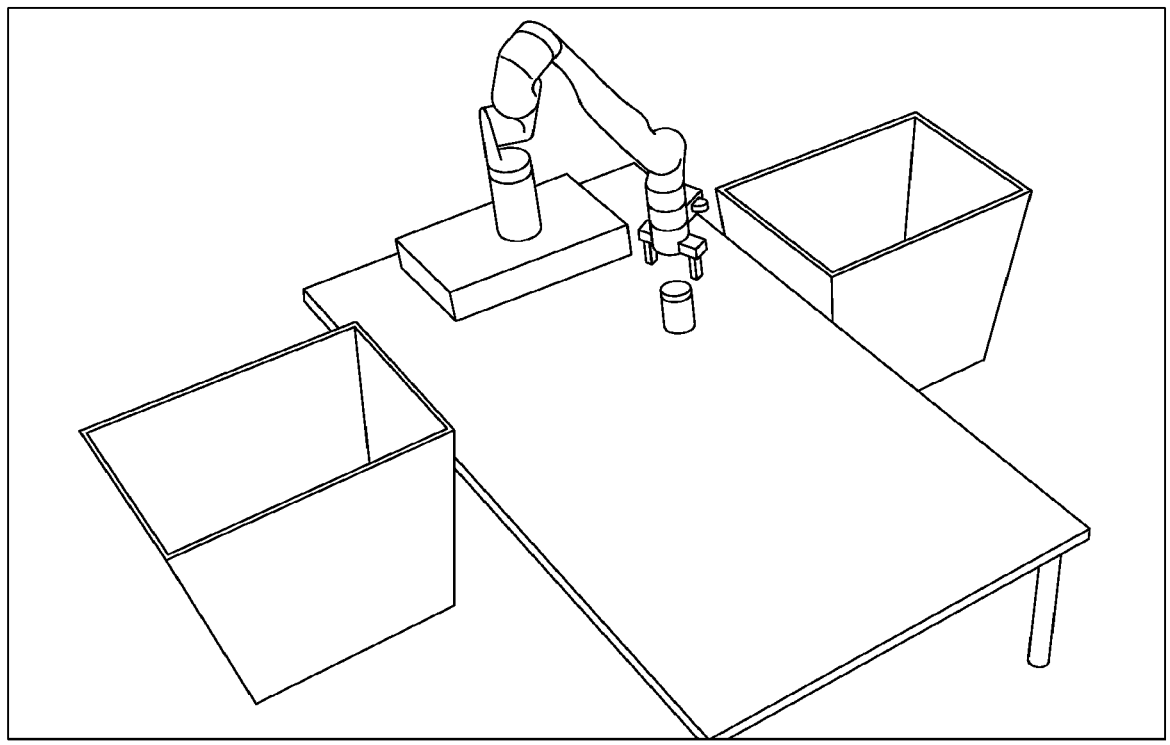
FIG. 20 shows a simulation setup according to an embodiment.

FIG. 20 shows a simulation setup according to an embodiment. In this example, the robotic manipulator comprises seven Degree of Freedom (DoF) and is directly controlled by a controller. The controller has prior knowledge of the location of the target can, and is responsible for generating control signals to control the robotic manipulator. The time in the communication schedule is slotted, and the control signals are time-varied sequences, where, at a single time slot, a command matrix includes the information of planned positions, speeds, accelerations of each Degree of Freedom (DoF). At each time slot, the controller transmits the current command matrix to the manipulator and waits for the feedback matrix. The controller transmits the next command matrix only when it has confirmed that the robotic manipulator has arrived at the expected posture based on the received feedback matrix.

In this simulation an imperfect network link with an added random latency is used for command transmission. The latency is modeled by a normal distribution with a mean of 0.01 seconds and a variance of 0.02 second. At each time slot, if the packet with the current command matrix was successfully received under the delay constraint, the manipulator executes actions according to the exact commands. In the following simulation two different control strategies were considered when the communication packet is lost or received with a delay, these being: 1) Benchmark (non-predictive model): controlling according to the last available command; and 2) Predictive method: controlling according to the predictive model. Here, a Vector Autoregressive (VAR) model was used as the predictive model.

Figure 21:
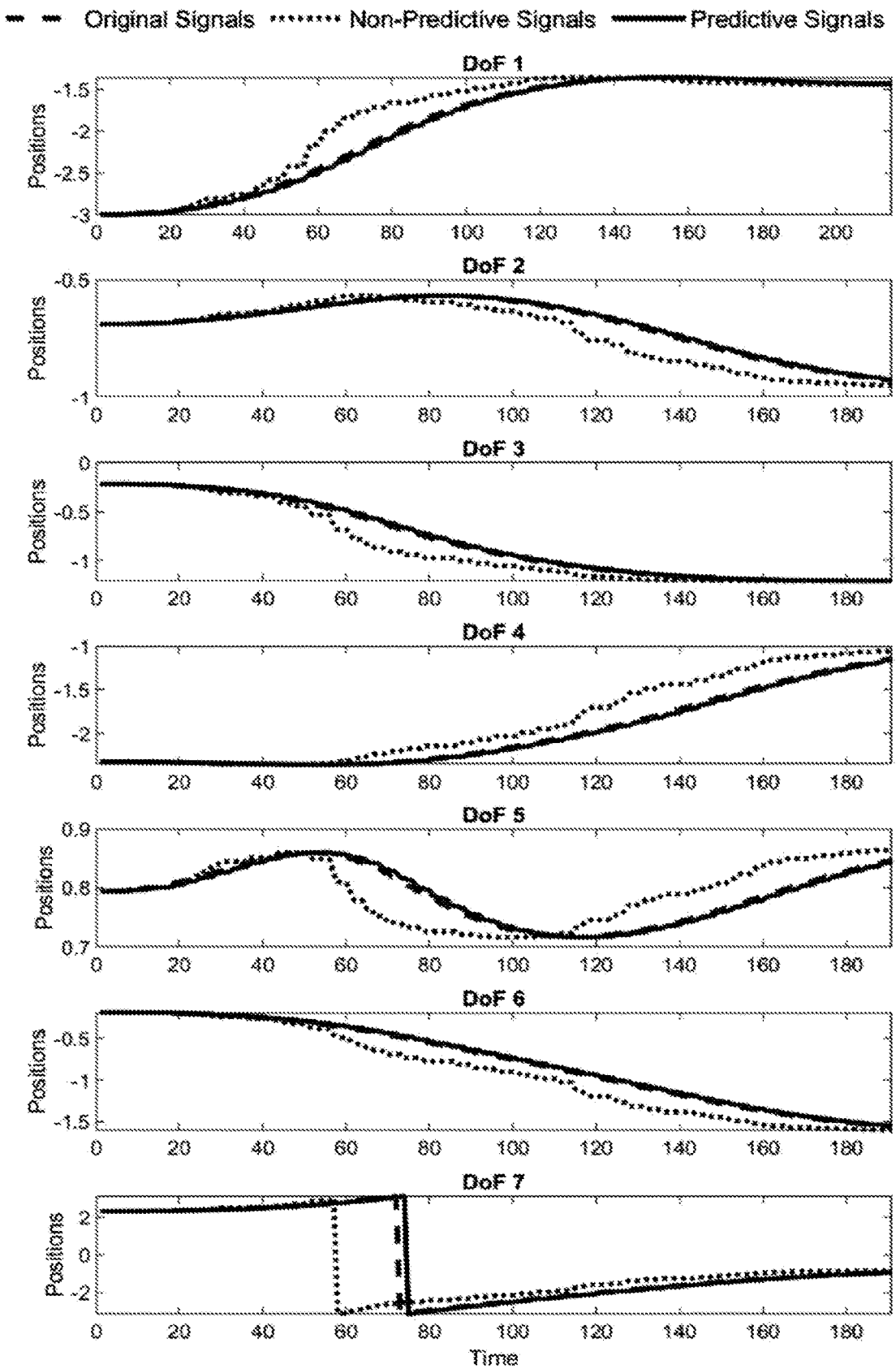
FIG. 21 shows a comparison of the trajectories obtained during testing of an embodiment.

FIG. 21 shows a comparison of the trajectories obtained during testing of an embodiment. Position signals from the source, the non-predictive model, and the predictive model, at each slot t, are denoted by $P^t_s$, $P^t_{np}$, $P^t_p$, respectively. FIG. 21 shows that, for each Degree of Freedom (DoF), the position signals from the predictive model are fairly close to the source (i.e. original signals), while those from the non-predictive model suffer from large inaccuracies. The relevant absolute error (AE) between the signals from the source and the non-predictive model is $E^t_{np}=|P^t_{np}-P^t_s|$, and the absolute error (AE) between signals from the source and the predictive model is $E^t_p=|P^t_p-P^t_s|$.

Figure 22:
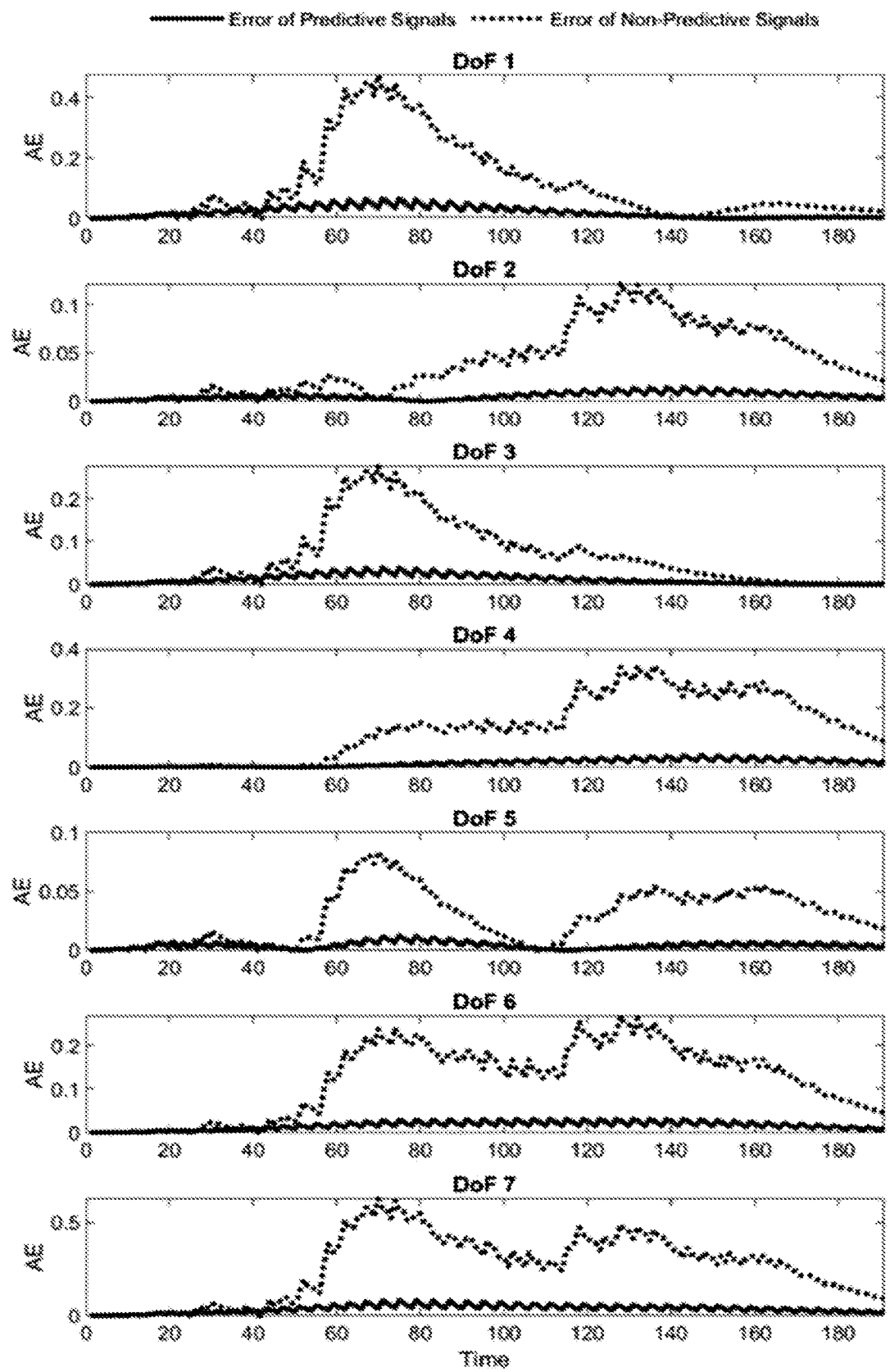
FIG. 22 shows a comparison of the average errors obtained during testing of the embodiment.

FIG. 22 shows a comparison of the average errors obtained during testing of the embodiment. FIG. 22 compares the absolute error (AE) between the signals from the source and the non-predictive model, with the absolute error (AE) between signals from the source and the predictive model. FIG. 22 shows the performance of the predictive model is considerably smaller and less fluctuated than that of the non-predictive model.

The success probability of achieving picking-and-putting task in a high latency environment (i.e., Normal distributed latency with a mean of 0.01 seconds and a variance of 0.02 second) was 83/100 for the predictive model and 36 for the non-predictive model. The success probability of achieving picking-and-putting task in a low latency environment (i.e., Normal distributed latency with a mean of 0.005 seconds and a variance of 0.01 second) was 87/100 for the predictive model and 49/100 for the non-predictive model. Each result was obtained after 100 iterations. These results further confirming that the predictive model according to an embodiment outperforms the non-predicative model.

The Temporal-Adaptive Prediction (TAP) technique discussed above was further evaluated using the data from Roda-Sales, A., Vergara, M., Sancho-Bru, J. L., Gracia-Ibáñez, V., & Jarque-Bou, N. J. (2019). Human hand kinematic data during feeding and cooking tasks. Scientific data, 6(1), 1-10, which is incorporated herein by reference. The data set comprises kinematics data of human hands during the performance of a wide variety of activities of daily living involving feeding and cooking.

Figure 23:
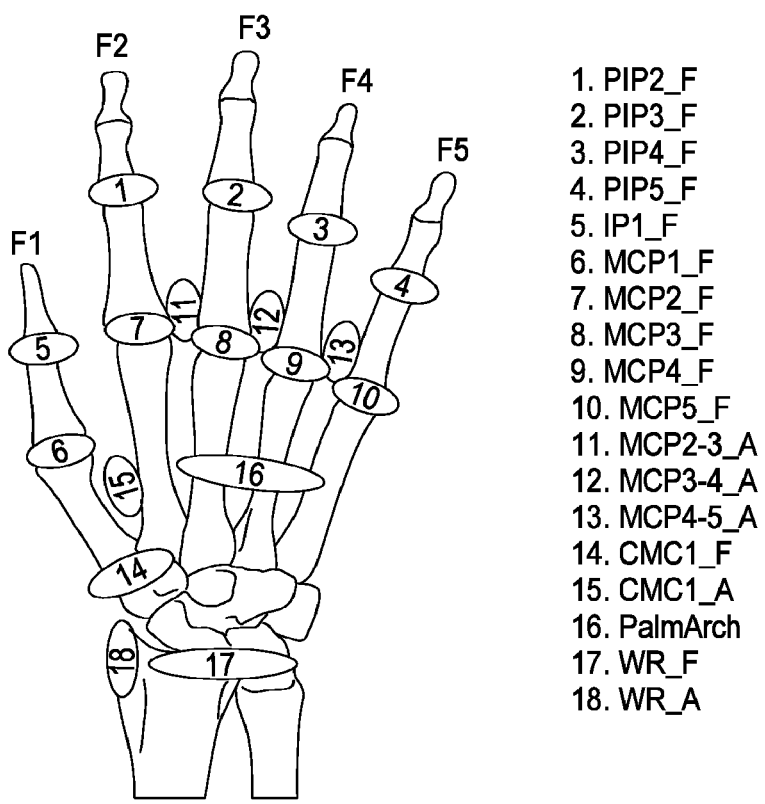
FIG. 23 shows the locations of data sources in a test data set.

FIG. 23 shows the locations of data sources in a test data set. As shown in FIG. 23, the dataset for each hand comprises 18 Degrees of Freedom (DoF). In a second test example the kinematics data from the data set was used to control a slave in real-time by transmitting the kinematic data via a network. The transmission rate of the network is limited, where only one command can be transmitted every six time slots. Therefore, after receiving a new command, the predictor is responsible for predicting the commands in the next five slots.

Figure 24:
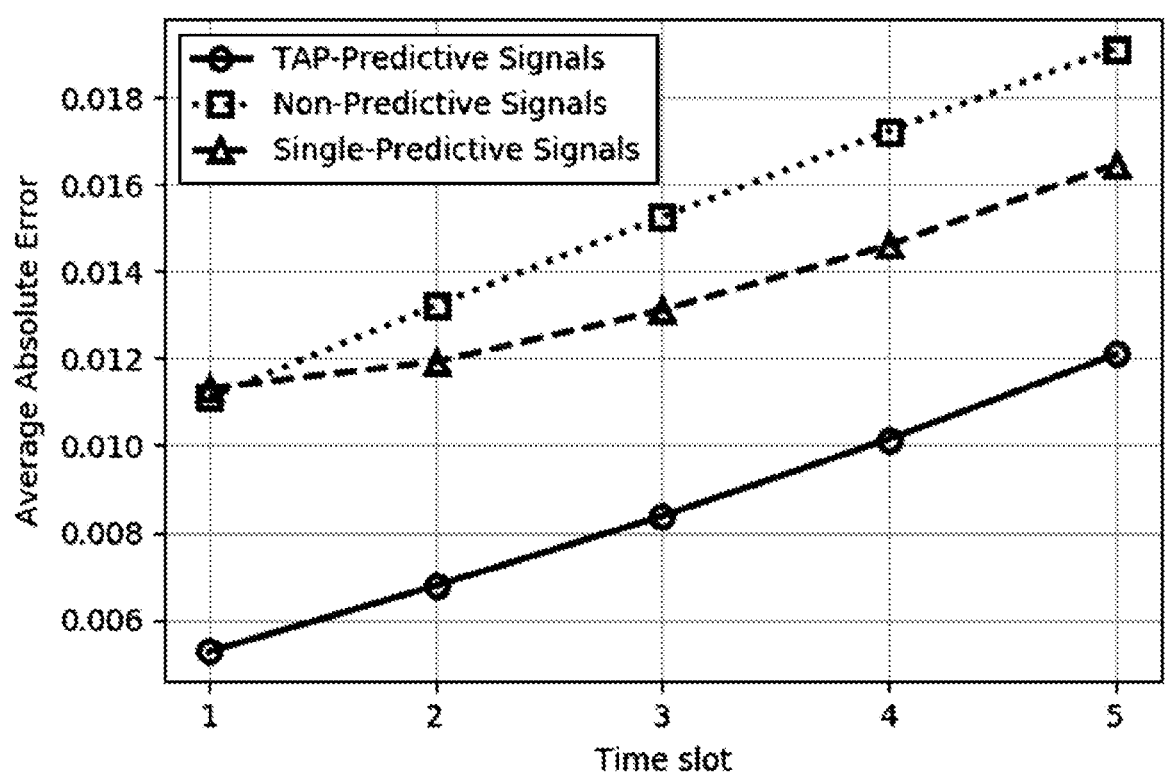
FIG. 24 shows a comparison between predicted signals for received command data in a second test example

FIG. 24 shows a comparison between predicted signals for received command data in a second test example. FIG. 24 shows the average absolute error between the source and the predictive models, including the Temporal-Adaptive Prediction (TAP) technique discussed above, a non-predictive method, and classical single-predictive method using a Vector Autoregressive (VAR) based predictor. The average absolute error is obtained by averaging the absolute error over samples and over each Degree of freedom (DoF). FIG. 24 shows that the proposed Temporal-Adaptive Prediction (TAP) technique outperforms the other methods.

Figure 25A:
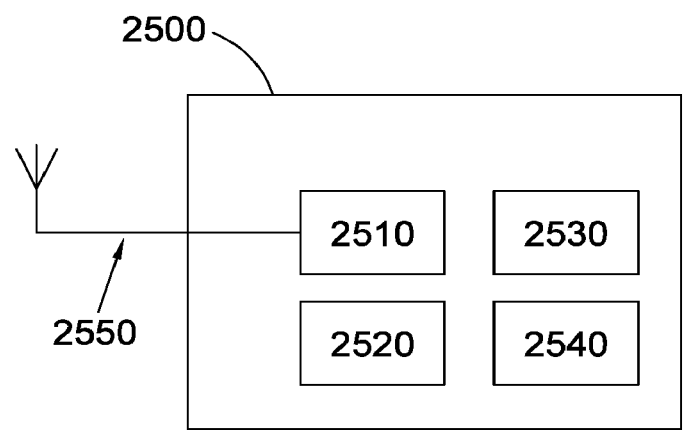
FIG. 25A shows a master system according to an embodiment.

FIG. 25A shows a master system according to an embodiment. The master system 2500 comprises an input/output module 2510, a processor 2520 and a non-volatile memory 2530. The input/output module 2510 is communicatively connected to an antenna 2550. The antenna 2550 is configured to receive and transmit signals via wireless communication link. The processor 2520 is coupled to the input/output module 2510 and to the non-volatile memory 2530. The non-volatile memory 2530 stores computer program instructions that, when executed, cause the processor 2520 to execute program steps that implement the methods described herein.

The master system 2500 comprises a controller 2540. The controller 2540 is configured to generate commands for controlling an actuator at a slave system. Optionally the controller 2540 is configured to communicate with an input means for capturing an input of a user. In an embodiment the input means is a movable controller e.g. a joystick. In an embodiment the master system 2450 is configured to receive feedback signals from a slave system via the wireless communication link and the antenna 2550. The controller subsequently generates commands based, at least partly, on these feedback signals.

Although FIG. 25A is described in relation to a master system it will be appreciated that a slave system and a base station also have similar structures. In particular, in a slave system the controller 2540 is replaced with an actuator configured to effect a process based on the command signals received from the master system via the wireless communication link. Optionally, the slave system further comprises a sensor configured to generate feedback signals for transmission via the antenna 2550 and the wireless communication link to the master system. In the case of a base station, instead of a actuator or controller the system comprises a wired interface for connection to the core network/internet.

Whilst in the embodiment described above the antenna 2550 is shown to be situated outside of, but connected to, the master system 2500 it will be appreciated that in other embodiments the antenna 2550 forms part of the master system 2500. Furthermore, although in FIG. 25A only a single antenna 2550 is shown it is emphasized that the input/output module 2510 may comprise a plurality of antennas.

Figure 25B:
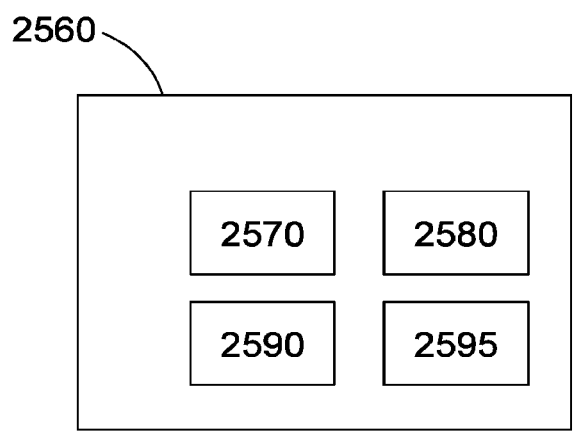
FIG. 25B shows a Mobile Edge Computing (MEC) server according to an embodiment.

FIG. 25B shows a Mobile Edge Computing (MEC) server according to an embodiment. The Mobile Edge Computing (MEC) server 2560 comprises an input/output module 2570, a processor 2580 and a non-volatile memory 2590. The processor 2580 is coupled to the input/output module 2570 and to the non-volatile memory 2590. The non-volatile memory 2590 stores computer program instructions that, when executed, cause the processor 2580 to execute program steps that implement the functionality of a Mobile Edge Computing (MEC) server as described herein. The input module 2570 adapted to be communicatively coupled to a core network, optionally via a wired connection. The system further comprises a prediction output interface 2595 that is configured to transmit predicted command/feedback signals to the slave system, optionally via a base station.

Although FIG. 25A shows the Mobile Edge Computing (MEC) server being a separate system to the slave system, it will be appreciated that the Mobile Edge Computing (MEC) server may be implemented as part of the slave system.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method for operating a real-time control system, the real-time control system comprising:
a first system configured to generate an information signal;
a second system configured to use the information signal, wherein the second system comprises a first buffer for storing a previously received information signal; and
a communication link between the first system and the second system,
the method comprising:
generating, by the first system, a first information signal for use in a first time slot;
transmitting, by the first system, a first communication packet via the communication link, the first communication packet comprising the first information signal;
generating, by the second system, a predicted first information signal for use in the first time slot, by:
retrieving the previously received information signal from the first buffer;
generating a first prediction based on the previously received information signal using a short-term predictor; and
concurrently generating a second prediction based on the previously received information signal using a long-term predictor, wherein the long-term predictor has a higher complexity and execution delay relative to the short-term predictor; and
setting the predicted first information signal equal to the first prediction unless the second prediction is available;
the method further comprising:
using, by the second system, the predicted first information signal in response to determining that the first information signal was not received by the second system in the first time slot.

2. The method according to claim 1 further comprising:
generating, by the first system, a second information signal for use in a second time slot; the second time slot being after the first time slot, and
generating, by the second system, a predicted second information signal for use in the second time slot, by:
generating a third prediction based on the previously received information signal using the short-term predictor; and
concurrently generating a fourth prediction based on the previously received information signal using the long-term predictor; and
setting the predicted second information signal equal to the third prediction unless the fourth prediction is available;
the method further comprising:
using, by the second system, the predicted second information signal in response to determining that the second information signal was not received by the second system in the second time slot.

3. The method according to claim 2 wherein the first system generates information signals at a first rate and transmits communication packets at a second rate less than the first rate, and wherein the method further comprises:
packing a number of information signals into the first communication packet before transmitting the first communication packet, wherein the number of information signals is less than or equal to the first rate divided by the second rate.

4. The method according to claim 3 wherein the first communication packet comprises the first information signal and the second information signal; and the method further comprises:
storing the first information signal and the second information signal in the first buffer in response to receiving the first communication packet.

5. The method according to claim 2 wherein the first system comprises a second buffer for storing a previously generated information signal, the method further comprising:
storing, by the first system, the first information signal in the second buffer;
setting, by the second system, a bundling factor for the second time slot equal to a bundling factor for the first time slot incremented by one in response to determining that that the first information signal was not received by the second system in the first time slot;
transmitting, by the second system, an acknowledgement message to the first system in the first time slot, the acknowledgement message comprising the bundling factor for the second time slot; and
in response to receiving the acknowledgement message:
transmitting, by the first system, a second communication packet via the communication link, the second communication packet comprising:
the second information signal; and
at least a copy of the first information signal.

6. The method according to claim 5 further comprising:
setting the bundling factor for the second time slot equal to zero in response to determining that the first information signal was received by the second system in the first time slot; and
clearing, by the first system, the second buffer in response to receiving the acknowledgment message comprising the bundling factor for the second time slot equaling zero.

7. The method according to claim 1 further comprising:
generating, by the second system, a third information signal for use in the first time slot; and
transmitting, by the second system, a third communication packet via the communication link, the third communication packet comprising the third information signal.

8. The method according to claim 7 wherein:
the second system further comprises a third buffer for storing a previously generated information signal; and
the second prediction generated using the long-term predictor is based on the previously received information signal and the previously generated information signal.

9. The method according to claim 7 wherein:
the first system further comprises a fourth buffer for storing a previously received information signal, the method further comprising:
generating, by the first system, a predicted third information signal for use in the first time slot, by:
retrieving the previously received information signal from the fourth buffer;
generating a fifth prediction based on the previously received information signal using a second short-term predictor;
concurrently generating a sixth prediction based on the previously received information signal using a second long-term predictor, wherein the second long-term predictor has a higher complexity and execution delay relative to the short-term predictor; and
setting the predicted third information signal equal to the fifth prediction unless the sixth prediction is available;
the method further comprising:
using, by the first system, the predicted third information signal in response to determining that the third information signal was not received by the first system in the first time slot.

10. The method according to claim 7 further comprising:
generating, by the second system, a fourth information signal for use in the second time slot;
setting, by the second system, a second bundling factor for the second time slot equal to a second bundling factor for the first time slot incremented by one, in response to determining that that the first information signal was not received by the second system in the first time slot;
transmitting, by the second system, a fourth communication packet comprising the fourth information signal and the second bundling factor; and
in response to receiving the fourth communication packet:
transmitting, by the first system, a fifth communication packet via the communication link, the fifth communication packet comprising:
a fifth information signal for use in a third time slot; and
at least a copy of the first information signal.

11. The method according to claim 1 wherein the first buffer comprises: a training sample comprising a plurality of successive information signals; and the long-term predictor comprises: a training machine learning model and a predictive machine learning model, the method further comprising:
updating the training machine learning model by:
retrieving the training sample from the first buffer;
separating the training sample into an input matrix and a label matrix;
generating, by the training machine learning model, a predicted sixth information signal based on the input matrix;
determining an average loss based on a difference between the predicted sixth information signal and at least part of the label matrix; and
updating the training machine learning model based on the average loss.

12. The method according to claim 11 further comprising:
determining a first prediction accuracy of the predictive machine learning model;
determining a second prediction accuracy of the training machine learning model; and
updating the predictive machine learning model with weights of the training machine learning model in response to determining that the second prediction accuracy is greater than the first prediction accuracy.

13. The method according to claim 1 wherein the first buffer comprises: a training sample comprising a plurality of successive information signals; and the long-term predictor comprises: a training machine learning model and a predictive machine learning model, the method further comprising:
  disabling an output of the long-term predictor such that only an output of the short-term predictor is available to the second system;
  initializing the training machine learning model with random weights;
  separating the training sample into an input matrix and a label matrix;
  determining an accuracy of the training machine learning model based on the input matrix and the label matrix;
  determining an accuracy of the short-term predictor based on the input matrix and the label matrix; and
  in response to determining that the accuracy of the training machine learning model is higher than the accuracy of the short-term predictor:
    setting weights of the predictive machine learning model equal to weights of the training machine learning model; and
    enabling the output of the long-term predictor such that an output of the predictive machine learning model is available to the second system.

14. A real-time control system comprising:
  a first system configured to generate an information signal;
  a second system configured to use the information signal, wherein the second system comprises a first buffer for storing a previously received information signal; and
  a communication link between the first system and the second system,
  the first system configured to:
    generate a first information signal for use in a first time slot;
    transmit a first communication packet via the communication link, the first communication packet comprising the first information signal;
  the second system configured to:
    generate a predicted first information signal for use in the first time slot, by:
      retrieving the previously received information signal from the first buffer;
      generating a first prediction based on the previously received information signal using a short-term predictor; and
      concurrently generating a second prediction based on the previously received information signal using a long-term predictor, wherein the long-term predictor has a higher complexity and execution delay relative to the short-term predictor; and
      setting the predicted first information signal equal to the first prediction unless the second prediction is available;
    use the predicted first information signal in response to determining that the first information signal was not received by the second system in the first time slot.

15. The real-time control system according to claim 14, wherein the first system is further configured to:
  generate a second information signal for use in a second time slot; the second time slot being after the first time slot, and
  generate a predicted second information signal for use in the second time slot, by:
    generating a third prediction based on the previously received information signal using the short-term predictor; and
    concurrently generating a fourth prediction based on the previously received information signal using the long-term predictor; and
    setting the predicted second information signal equal to the third prediction unless the fourth prediction is available;
    using the predicted second information signal in response to determining that the second information signal was not received by the second system in the second time slot.

16. The real-time control system according to claim 15 wherein the first system comprises a second buffer for storing a previously generated information signal and is configured to:
  store the first information signal in the second buffer; the second system further configured to:
  set a bundling factor for the second time slot equal to a bundling factor for the first time slot incremented by one in response to determining that that the first information signal was not received by the second system in the first time slot; and
  transmit an acknowledgement message to the first system in the first time slot, the acknowledgement message comprising the bundling factor for the second time slot;
  wherein the first system is further configured to:
  transmit a second communication packet via the communication link in response to receiving the acknowledgement message wherein,
  the second communication packet comprising:
    the second information signal; and
    at least a copy of the first information signal.

17. The real-time control system according to claim 14 wherein the second system is further configured to:
  generate a third information signal for use in the first time slot; and
  transmit a third communication packet via the communication link, the third communication packet comprising the third information signal.

18. The real-time control system according to claim 17 wherein:
  the first system further comprises a fourth buffer for storing a previously received information signal, and the first system is further configured to:
    generate a predicted third information signal for use in the first time slot, by:
      retrieving the previously received information signal from the fourth buffer;
      generating a fifth prediction based on the previously received information signal using a second short-term predictor;
      concurrently generating a sixth prediction based on the previously received information signal using a second long-term predictor, wherein the second long-term predictor has a higher complexity and execution delay relative to the short-term predictor; and
      setting the predicted third information signal equal to the fifth prediction unless the sixth prediction is available;
    the first system further configured to:
    use the predicted third information signal in response to determining that the third information signal was not received by the first system in the first time slot.

19. The real-time control system according to claim 17 wherein the second system is further configured to:
  generate a fourth information signal for use in the second time slot;

set a second bundling factor for the second time slot equal to a second bundling factor for the first time slot incremented by one, in response to determining that that the first information signal was not received by the second system in the first time slot;

transmit a fourth communication packet comprising the fourth information signal and the second bundling factor; and wherein the first system is further configured to:

transmit a fifth communication packet via the communication link in response to receiving the fourth communication packet, the fifth communication packet comprising:

a fifth information signal for use in a third time slot; and at least a copy of the first information signal.

20. A system comprising a first buffer for storing received information signals, a short-term predictor and a long-term predictor, the system configured to generate a predicted first information signal for use in a first time slot, by:

retrieving a previously received information signal from the first buffer;

generating a first prediction based on the previously received information signal using a short-term predictor; and generating a second prediction based on the previously received information signal using a long-term predictor, wherein the long-term predictor has a higher complexity and execution delay relative to the short-term predictor; and setting the predicted first information signal equal to the first prediction unless the second prediction is available;

use the predicted first information signal in response to determining that an information signal relating to a current time slot was not received by the system.

\* \* \* \* \*